United States Patent
Nagai et al.

(10) Patent No.: US 8,266,340 B2
(45) Date of Patent: Sep. 11, 2012

(54) DMA CONTROLLER

(75) Inventors: Yasushi Nagai, Fujisawa (JP); Hiroshi Nakagoe, Yokohama (JP); Shigeki Taira, Yokohama (JP)

(73) Assignee: Renesas Electronics Corporation, Kanagawa (JP)

( * ) Notice: Subject to any disclaimer, the term of this patent is extended or adjusted under 35 U.S.C. 154(b) by 0 days.

(21) Appl. No.: 13/437,297

(22) Filed: Apr. 2, 2012

(65) Prior Publication Data

US 2012/0191882 A1 Jul. 26, 2012

Related U.S. Application Data

(63) Continuation of application No. 12/595,381, filed as application No. PCT/JP2008/055292 on Mar. 21, 2008, now Pat. No. 8,176,221.

(30) Foreign Application Priority Data

Apr. 11, 2007 (JP) ................................. 2007-103509

(51) Int. Cl.
*G06F 13/28* (2006.01)
*G06F 13/00* (2006.01)

(52) U.S. Cl. ......................................... 710/22; 710/308
(58) Field of Classification Search .............. 710/22–28, 710/308
See application file for complete search history.

(56) References Cited

U.S. PATENT DOCUMENTS

| | | | |
|---|---|---|---|
| 6,898,723 B2 | 5/2005 | Tsai | |
| 6,988,167 B2 | 1/2006 | Allen et al. | |
| 7,185,122 B2 * | 2/2007 | Nishioka | 710/34 |
| 2003/0088718 A1 | 5/2003 | Higuchi | |
| 2004/0153589 A1 * | 8/2004 | Nishioka | 710/52 |
| 2006/0047866 A1 | 3/2006 | Yamazaki | |

FOREIGN PATENT DOCUMENTS

| | | |
|---|---|---|
| JP | 08-249267 | 9/1996 |
| JP | 10-063606 | 3/1998 |
| WO | WO 02/08919 A1 | 1/2002 |

OTHER PUBLICATIONS

Office Action in JP 2007-103509, dispatched Sep. 27, 2011, (in Japanese, 2 pgs.), with English language translation (2 pgs.).

* cited by examiner

*Primary Examiner* — Christopher B Shin
(74) *Attorney, Agent, or Firm* — Antonelli, Terry, Stout & Kraus, LLP.

(57) ABSTRACT

The DMA controller includes a peripheral device read unit to read states of peripheral devices, a state comparator, a transfer unit, a register, and a peripheral device write unit to write data in the peripheral devices according to the contents in the register when the DMA transfer is executed, an interrupt select unit selects one of plural interrupt signals to determine whether the peripheral device read unit, the state comparator and the transfer unit are at a timing to execute operations. Based on these operations the state comparator determines whether to start the DMA transfer, and the transfer unit executes data transfer between the peripheral devices.

7 Claims, 22 Drawing Sheets

FIG. 11

| | |
|---|---|
| OPERATION ENABLE | 201 |
| PERIPHERAL DEVICE READ COUNTER ENABLE | 202 |
| PERIPHERAL DEVICE READ COUNTER VALUE | 203 |
| PERIPHERAL DEVICE READ CYCLE | 204 |
| PERIPHERAL DEVICE NEXT READ COUNTER VALUE | 205 |
| PERIPHERAL DEVICE READ ADDRESS | 206 |
| PERIPHERAL DEVICE READ ACCESS SIZE | 207 |
| COMPARISON CONDITIONS | 208 |
| OPERATION CONTENTS | 209 |
| PERIPHERAL DEVICE READ COMPARISON DATA | 210 |
| PERIPHERAL DEVICE READ MASK DATA | 211 |
| PERIPHERAL DEVICE READ NEXT CYCLE ADJUSTMENT METHOD | 212 |
| TRANSFER SOURCE ADDRESS | 213 |
| TRANSFER DESTINATION ADDRESS | 214 |
| TRANSFER SOURCE ACCESS SIZE | 215 |
| TRANSFER DESTINATION ACCESS SIZE | 216 |
| TRANSFER SOURCE LOOP SIZE | 217 |
| TRANSFER DESTINATION LOOP SIZE | 218 |
| TRANSFER SOURCE ADDRESS COUNT DIRECTION | 219 |
| TRANSFER DESTINATION ADDRESS COUNT DIRECTION | 220 |
| TRANSFER SIZE | 221 |
| PERIPHERAL DEVICE WRITE METHOD | 231 |
| PERIPHERAL DEVICE WRITE ADDRESS | 232 |
| PERIPHERAL DEVICE WRITE ACCESS SIZE | 233 |
| PERIPHERAL DEVICE WRITE DATA | 234 |
| PERIPHERAL DEVICE WRITE MASK DATA | 235 |

| | |
|---|---|
| PERIPHERAL DEVICE READ CYCLE | 304 |
| PERIPHERAL DEVICE NEXT READ COUNTER VALUE | 305 |
| PERIPHERAL DEVICE READ ADDRESS | 306 |
| PERIPHERAL DEVICE READ ACCESS SIZE | 307 |
| COMPARISON CONDITIONS | 308 |
| OPERATION CONTENTS | 309 |
| PERIPHERAL DEVICE READ COMPARISON DATA | 310 |
| PERIPHERAL DEVICE READ MASK DATA | 311 |
| PERIPHERAL DEVICE READ NEXT CYCLE ADJUSTMENT METHOD | 312 |
| TRANSFER SOURCE ADDRESS | 313 |
| TRANSFER DESTINATION ADDRESS | 314 |
| TRANSFER SOURCE ACCESS SIZE | 315 |
| TRANSFER DESTINATION ACCESS SIZE | 316 |
| TRANSFER SOURCE LOOP SIZE | 317 |
| TRANSFER DESTINATION LOOP SIZE | 318 |
| TRANSFER SOURCE ADDRESS COUNT DIRECTION | 319 |
| TRANSFER DESTINATION ADDRESS COUNT DIRECTION | 320 |
| TRANSFER SIZE | 321 |
| PERIPHERAL DEVICE WRITE METHOD | 331 |
| PERIPHERAL DEVICE WRITE ADDRESS | 332 |
| PERIPHERAL DEVICE WRITE ACCESS SIZE | 333 |
| PERIPHERAL DEVICE WRITE DATA | 334 |
| PERIPHERAL DEVICE WRITE MASK DATA | 335 |

| | |
|---|---|
| OPERATION ENABLE | 201 |
| PERIPHERAL DEVICE READ COUNTER ENABLE | 202 |
| PERIPHERAL DEVICE READ COUNTER VALUE | 203 |
| PERIPHERAL DEVICE READ CYCLE | 204 |
| PERIPHERAL DEVICE NEXT READ COUNTER VALUE | 205 |
| PERIPHERAL DEVICE READ ADDRESS | 206 |
| PERIPHERAL DEVICE READ ACCESS SIZE | 207 |
| COMPARISON CONDITIONS | 208 |
| OPERATION CONTENTS | 209 |
| PERIPHERAL DEVICE READ COMPARISON DATA | 210 |
| PERIPHERAL DEVICE READ MASK DATA | 211 |
| PERIPHERAL DEVICE READ NEXT CYCLE ADJUSTMENT METHOD | 212 |
| TRANSFER SOURCE ADDRESS | 213 |
| TRANSFER DESTINATION ADDRESS | 214 |
| TRANSFER SOURCE ACCESS SIZE | 215 |
| TRANSFER DESTINATION ACCESS SIZE | 216 |
| TRANSFER SOURCE LOOP SIZE | 217 |
| TRANSFER DESTINATION LOOP SIZE | 218 |
| TRANSFER SOURCE ADDRESS COUNT DIRECTION | 219 |
| TRANSFER DESTINATION ADDRESS COUNT DIRECTION | 220 |
| TRANSFER SIZE | 221 |
| PERIPHERAL DEVICE WRITE METHOD | 231 |
| PERIPHERAL DEVICE WRITE ADDRESS | 232 |
| PERIPHERAL DEVICE WRITE ACCESS SIZE | 233 |
| PERIPHERAL DEVICE WRITE DATA | 234 |
| PERIPHERAL DEVICE WRITE MASK DATA | 235 |
| OPERATION DESCRIPTION ADDRESS | 241 |

| | | |
|---|---|---|
| OPERATION ENABLE | 201 | |
| PERIPHERAL DEVICE READ ADDRESS | 206 | 306 PERIPHERAL DEVICE READ ADDRESS |
| PERIPHERAL DEVICE READ ACCESS SIZE | 207 | 307 PERIPHERAL DEVICE READ ACCESS SIZE |
| COMPARISON CONDITIONS | 208 | 308 COMPARISON CONDITIONS |
| OPERATION CONTENTS | 209 | 309 OPERATION CONTENTS |
| PERIPHERAL DEVICE READ COMPARISON DATA | 210 | 310 PERIPHERAL DEVICE READ COMPARISON DATA |
| PERIPHERAL DEVICE READ MASK DATA | 211 | 311 PERIPHERAL DEVICE READ MASK DATA |
| PERIPHERAL DEVICE READ NEXT CYCLE ADJUSTMENT METHOD | 212 | 312 PERIPHERAL DEVICE READ NEXT CYCLE ADJUSTMENT METHOD |
| TRANSFER SOURCE ADDRESS | 213 | 313 TRANSFER SOURCE ADDRESS |
| TRANSFER DESTINATION ADDRESS | 214 | 314 TRANSFER DESTINATION ADDRESS |
| TRANSFER SOURCE ACCESS SIZE | 215 | 315 TRANSFER SOURCE ACCESS SIZE |
| TRANSFER DESTINATION ACCESS SIZE | 216 | 316 TRANSFER DESTINATION ACCESS SIZE |
| TRANSFER SOURCE LOOP SIZE | 217 | 317 TRANSFER SOURCE LOOP SIZE |
| TRANSFER DESTINATION LOOP SIZE | 218 | 318 TRANSFER DESTINATION LOOP SIZE |
| TRANSFER SOURCE ADDRESS COUNT DIRECTION | 219 | 319 TRANSFER SOURCE ADDRESS COUNT DIRECTION |
| TRANSFER DESTINATION ADDRESS COUNT DIRECTION | 220 | 320 TRANSFER DESTINATION ADDRESS COUNT DIRECTION |
| TRANSFER SIZE | 221 | 321 TRANSFER SIZE |
| PERIPHERAL DEVICE WRITE METHOD | 231 | 331 PERIPHERAL DEVICE WRITE METHOD |
| PERIPHERAL DEVICE WRITE ADDRESS | 232 | 332 PERIPHERAL DEVICE WRITE ADDRESS |
| PERIPHERAL DEVICE WRITE ACCESS SIZE | 233 | 333 PERIPHERAL DEVICE WRITE ACCESS SIZE |
| PERIPHERAL DEVICE WRITE DATA | 234 | 334 PERIPHERAL DEVICE WRITE DATA |
| PERIPHERAL DEVICE WRITE MASK DATA | 235 | 335 PERIPHERAL DEVICE WRITE MASK DATA |

111

DMA CONTROLLER

CROSS-REFERENCE TO RELATED APPLICATIONS

This application is a continuation of U.S. application Ser. No. 12/595,381, filed Jun. 8, 2010, now U.S. Pat. No. 8,176,221 and which application is a §371 national stage application of PCT/JP2008/055292, filed Mar. 21, 2008, the entire contents of which are incorporated herein by reference.

TECHNICAL FIELD

The present invention relates to a DMA controller which performs data transfer among peripheral devices handling multimedia data in a computer system, for example, a technique effectively applied to a technique for performing storage for storing image, audio, metadata relating to them, and data transfer between audio decoders efficiently and without increasing a load on a CPU.

BACKGROUND ART

In these years, as computer systems have become widely used, needs for technique of efficiently performing processing of multimedia data including audio, video, and the like have been growing. Multimedia processing is a repeat of simple data transfers, which is required to have high real-time property and throughput. Thus, the direct memory access system (DMA system) has been employed for the multimedia processing instead of the program I/O control system (PIO control system) which places a large load on a CPU.

In a conventional computer system having a CPU, a memory, an input device, an output device, and a DMA controller, in the case of achieving periodic high-speed transfers of multimedia data between the input device and the memory, among different areas in a memory, and between the memory and the output device, interrupt program has been executed by periodic interrupts from a timer to the CPU to control operation of the DMA controller by this interrupt program.

Also, if it is unable to measure the timing by the timer, the polling method, which continues reading a register value indicating states of peripheral devices by the CPU until the peripheral devices become a suitable state for starting DMA transfers, has been employed.

Further, as the DMA controller disclosed in Japanese Patent Application Laid-Open Publication No. H8-249267 (Patent Document 1), if a control cycle of the DMA controller is accurate, a method, which reduces the CPU load for interrupt by measuring time by a counter embedded in the DMA controller and performing DMA transfers in a constant cycle without interposing a CPU, has been employed.

However, if jitter exists in the operation cycle of the peripheral devices, it has been unable to employ the method such as that of Patent Document 1, and it has been required to employ interrupt or the polling method as described above.
Patent Document 1: Japanese Patent Application Laid-Open Publication No. H8-249267

DISCLOSURE OF THE INVENTION

Problems to be Solved by the Invention

Many of peripheral devices relating to media processing are unable to be operated in a completely constant cycle. For example, a disk storage device such as hard disk has inconstant response time due to seek moving a head and error processing. Further, the network also has inconstant throughput due to its route or error, and jitter is generated. While a decoder for image and/or audio is operated in a substantially constant cycle, a compression rate of the image and/or audio data is not constant and time for extracting them is not constant either, and thus the processing may not be finished in a constant cycle. In this manner, since jitter exists while many of the peripheral devices are operated in a substantially constant cycle, CPU processing for confirming the state of each peripheral device is required before performing a DMA transfer, and thus the interrupt by a peripheral device and/or the polling method has been employed.

Since processings periodically repeated by the CPU have been achieved in the interrupt and the polling method, the following problems have existed.

First, since program for interrupt or polling periodically executed is necessary, the program size is increased to waste the memory. Further, for periodically executing program different from application, lowering of CPU processing property occurs due to lowering of the efficiency of cache use of the CPU.

In addition, the CPU load for execution of a program that is different from an application and switching of executed programs increases, and thus the CPU resource available for applications is reduced. A way for reducing the CPU load is to employ a multi-CPU configuration. However, although this way improves the efficiency of the CPU executing applications, the same problem occurs in the CPU performing control of the DMA or peripheral devices, and thus there is also a problem of increasing the CPU load.

Further, since the CPU is required to have high real-time property, the system cost increases. For example, to increase accuracy of DMA starting time, a time period for switching an operation program to an interrupt program or a polling program and a time period for executing the program should be shortened. Thus, increase of a hardware cost resulting from improvement of hardware performance such as employing multi-CPU, enhancement of a memory, a register, and a control circuit of them for program switching, and improvement of CPU operation frequency, and increase of a software development cost for advanced optimization of programs are conceivable. Particularly, improvement of hardware performance as mentioned above causes increase of power consumption, which is more problematic.

These requirements relating to the real-time property of CPU processing become severer when a plurality of peripheral devices having different cycles are used. When the CPU processing is executed by timer interrupt, the interrupt cycle is the highest common factor of interrupt cycles of the respective peripheral devices, so that the number of times of operations of the interrupt program is sharply increased, and thus the CPU load is increased.

Consequently, a preferred aim of the present invention is to provide a DMA controller which is capable of execution of an interrupt program or a polling program, which has been performed by a CPU, by adding a small-scale circuit, and achieves effective usage of existing peripheral devices, flexible handling of jitter in an operation cycle of a peripheral device, reduction of a usage amount of a memory or a storage by a program(s), improvement of CPU cache efficiency, and high real-time property at a low cost and with low power consumption.

The above and other preferred aims and novel characteristics of the present invention will be apparent from the description of this specification and the accompanying drawings.

Means for Solving the Problems

The typical ones of the inventions disclosed in the present application will be briefly described as follows.

A DMA controller according to the present invention has: a counter for measuring time; a counter comparator comparing a value of the counter and a counter value indicating an expected time of a DMA transfer; a peripheral device read unit reading a register of a peripheral device to acquire a state of the peripheral device; and a state comparator comparing a value of the register read by the peripheral device read unit and a start condition of the DMA transfer, wherein, with being triggered by establishment of a comparison result by the counter comparator, in accordance with a specified order, a processing of updating the counter value indicating the expected time of the DMA transfer to a value indicating a next expected time, a read of the register of the peripheral device by the peripheral device read unit, a comparison by the state comparator, and a DMA transfer on the conditions of establishment of the comparison result by the state comparator are executed.

EFFECTS OF THE INVENTION

The effects obtained by typical aspects of the present invention disclosed in the present application will be briefly described below.

According to the DMA controller of the present invention, with effectively using a memory bus being a small-scale circuit and having a high switching speed, it becomes possible to perform a DMA transfer by the DMA controller periodically confirming state of the register of the existing peripheral device and a memory independently without having a help of a CPU. Therefore, without embracing the cost of adding a special change to the existing peripheral device, the system performance can be improved with flexibly handling jitter in an operation cycle of the peripheral device and reducing CPU load.

BRIEF DESCRIPTIONS OF THE DRAWINGS

FIG. 11 is a diagram illustrating a configuration of registers according to a third embodiment of the present invention;

FIG. 12 is a diagram illustrating a configuration of registers according to a fourth embodiment of the present invention;

FIG. 19 is a diagram illustrating a configuration of registers according to the seventh embodiment of the present invention;

BEST MODE FOR CARRYING OUT THE INVENTION

Hereinafter, embodiments of the present invention will be described in detail with reference to the accompanying drawings. Note that components having the same function are denoted by the same reference symbols throughout the drawings for describing the embodiment, and the repetitive description thereof will be omitted.

An embodiment of the present invention is for a DMA controller with a peripheral device state confirmation function, the DMA controller having a peripheral device read unit which uses a counter for measuring time or an interrupt signal to perform a periodical DMA transfer and acquires a state of a peripheral device and/or an execution state of a program at a CPU relating to the DMA transfer with being triggered by a cycle determined by a value of the counter or the interrupt signal, and achieving an independent DMA transfer in accordance with the state of the peripheral device and/or the execution state of the program at the CPU.

First Embodiment

A DMA controller with a peripheral device state confirmation function (hereinafter, called "DMAC") of a first embodiment of the present invention will be described with reference to FIGS. 1 and 2.

Figure 1:
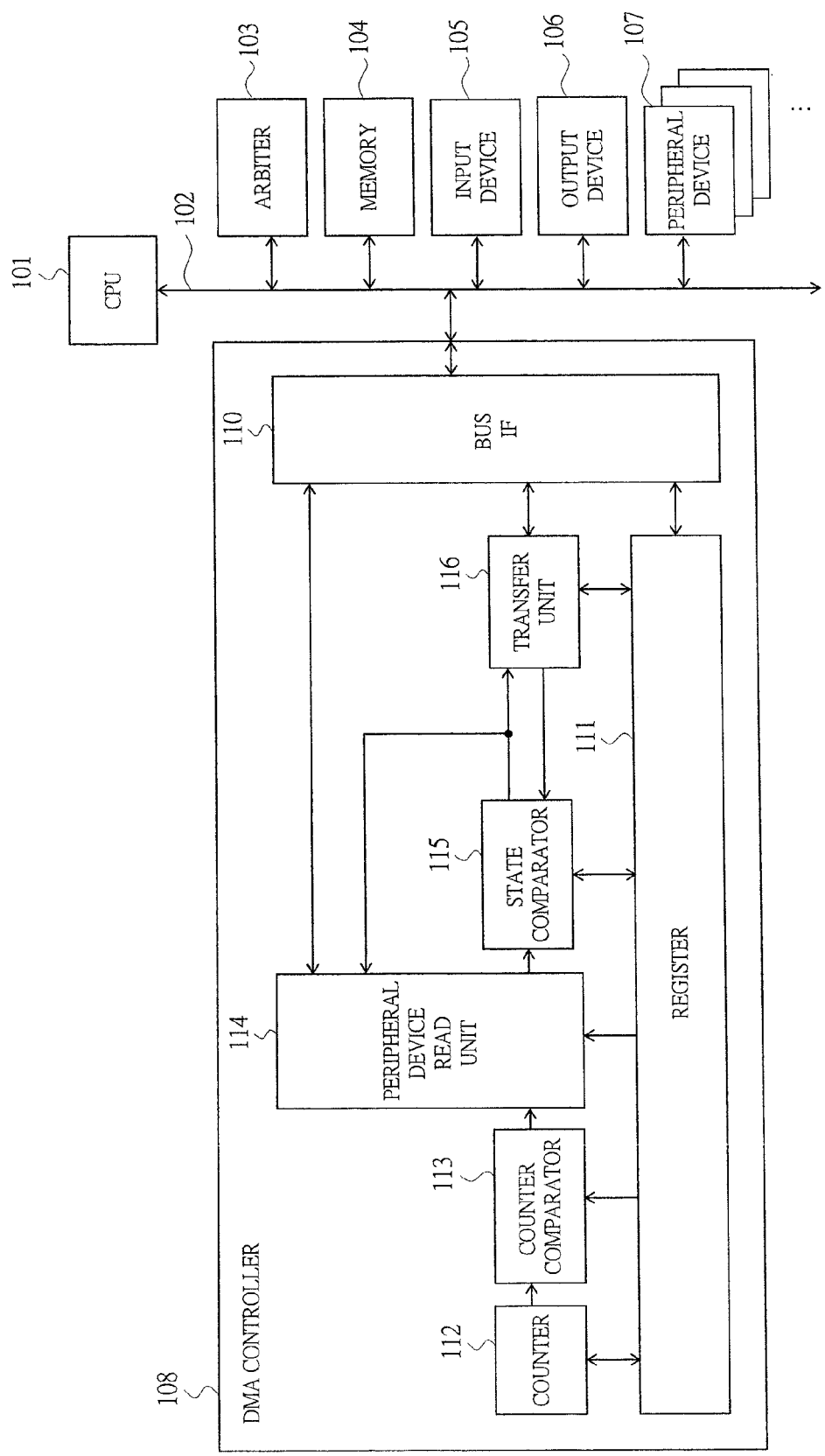
FIG. 1 is a function block diagram illustrating a configuration of a computer system mounting a DMAC according to a first embodiment of the present invention.

FIG. 1 is a function block diagram illustrating a configuration of a computer system mounting the DMAC according to the present embodiment. In FIG. 1, the computer system is configured to have a CPU 101, a bus 102, an arbiter 103, a memory 104, an input device 105, an output device 106, a peripheral device 107, and a DMAC 108.

The CPU 101 manages and controls respective devices of the arbiter 103, the memory 104, the input device 105, the output device 106, the peripheral device 107, and the DMAC 108 via the bus 102. The arbiter 103 arbitrates use requests of the bus 102 from the CPU 101, the memory 104, the input device 105, the output device 106, the peripheral device 107, and the DMAC 108. The memory 104 stores a program which the CPU 101 executes and/or data. The input device 105 receives operation of the computer system by a user and/or input data. The output device 106 transmits notification information of the computer system to a user and/or data. The peripheral device 107 is a decoder, a tuner, or the like for assisting processing of the CPU 101, and it is possible to configure with a plurality of the peripheral devices 107.

The DMAC 108 according to the present embodiment is configured with respective function blocks of a bus IF 110, a register 111, a counter 112, a counter comparator 113, a peripheral device read unit 114, a state comparator 115, and a transfer unit 116.

The bus IF 110 receives instruction from the CPU 101 via the bus 102, and the DMAC 108 provides an interface for performing read/write of the memory 104 or a register of the peripheral device 107. The register 111 stores contents of the instruction from the CPU 101. The counter 112 operates in accordance with contents of setting of the register 111, and, to determine an operation timing of the DMAC 108, the counter 112 executes a count procedure to measure time by counting in accordance with clock in a constant cycle.

The counter comparator 113 executes a counter comparison procedure for determining whether the respective function blocks of the subsequent stages, which are the peripheral device read unit 114 to the transfer unit 116, are at timing to execute periodic operations based on a value of the counter 112 and in accordance with the contents of instruction set to the register 111 by the CPU 101. When they are determined to be at timing to execute the periodic operations from a result of a comparison by the counter comparator 113, the peripheral device read unit 114 executes a peripheral device read procedure for performing read of their registers to detect a state of the memory 104 and/or the peripheral device 107 in accordance with the contents of the instruction to the register 111 set by the CPU 101.

The state comparator 115 executes a state comparison procedure for comparing contents of the memory 104 and/or the register of the peripheral device 107 read by the peripheral device read unit 114 and a start condition of a DMA transfer set to the register 111 by the CPU 101. As receiving a result of the comparison by the state comparator 115, when the start condition of the DMA transfer is determined to be satisfied, the transfer unit 116 performs data transfers within the memory 104, between the memory 104 and the peripheral device 107, and among the peripheral devices 107 in accordance with the contents of instruction set to the register 111 by the CPU 101.

Figure 2:
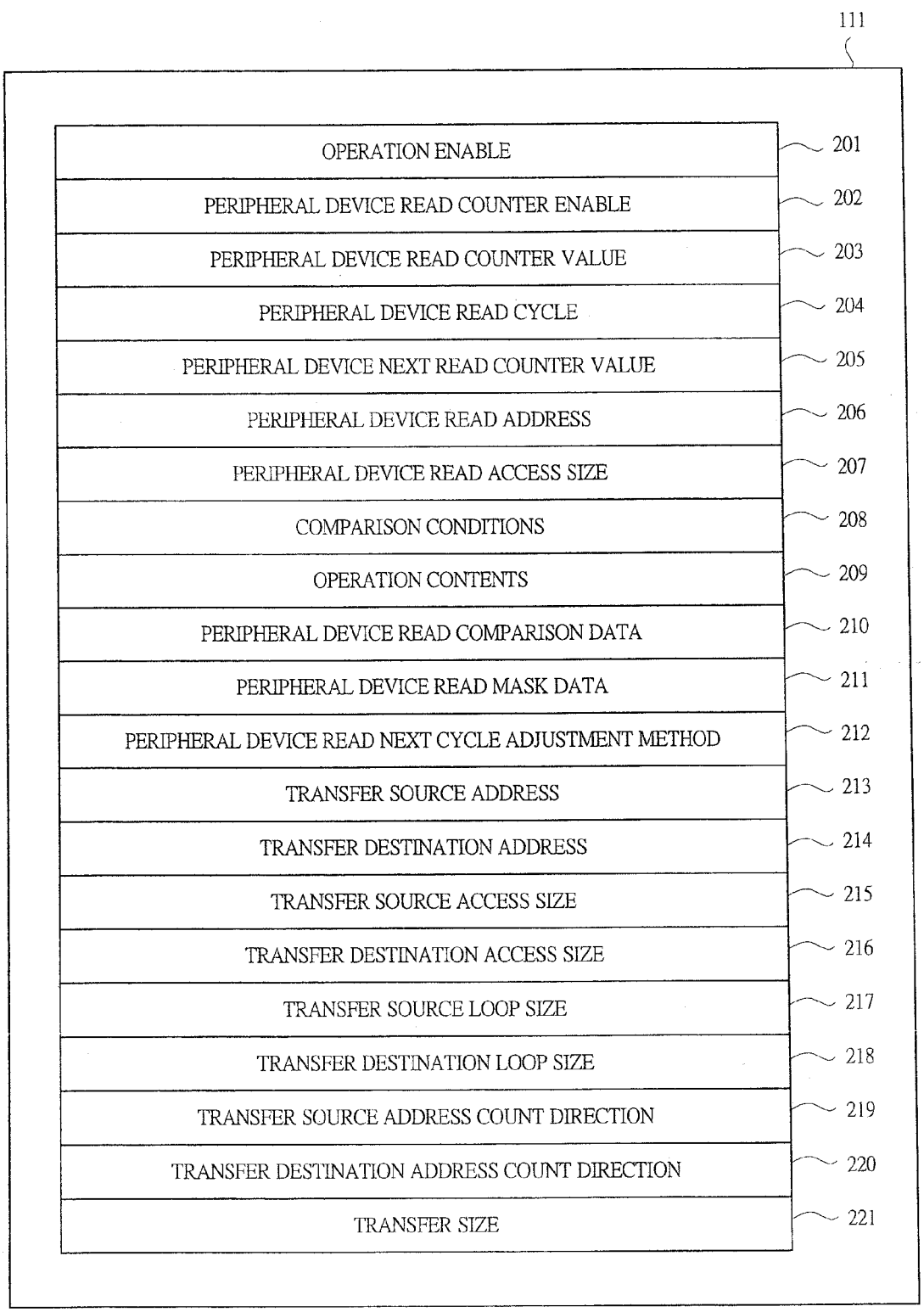
FIG. 2 is a diagram illustrating a configuration of registers in the DMAC according to the first embodiment of the present invention.

FIG. 2 is a diagram illustrating a configuration of registers which the register 111 has in the DMAC 108 according to the present embodiment. The CPU 101 sets these registers, and the DMAC 108 according to the present embodiment periodically confirms a state of the memory 104 and/or the peripheral device 107 via the bus IF 110 in accordance with the contents of the setting and performs a DMA transfer in synchronization with these devices.

In FIG. 2, an operation enable register 201 is a register which stores settings of operation and non-operation of the DMAC 108. A peripheral device read counter enable register 202 is a register which stores settings of operation and non-operation of the counter 112.

A peripheral device read counter value register 203 is a register which stores time from the start of operation of the counter 112. After an initial value of the counter 112 is set by the CPU 101 to set the peripheral device read counter enable register 202 to an operation state, the CPU 101 can acquire the value of the counter 112 in operation by reading the peripheral device read counter value register 203.

A peripheral device read cycle register 204 is a register which stores a cycle of performing reads of the peripheral device read unit 114 to confirm a state of the memory 104 and/or the peripheral device 107. A peripheral device next read counter value register 205 is a register which stores a counter value of performing reads of the peripheral device read unit 114 next. A value of this register and a value of the counter 112 are compared by the counter comparator 113, and when the values correspond with each other, the peripheral device read unit 114 is operated so that a periodic operation is achieved.

A peripheral device read address register 206 is a register which stores an area of the memory 104 indicating a state of a program being executed by the CPU 101 and/or address of the register of the peripheral device 107, the area and address being subjects to be confirmed its states by the peripheral device read unit 114. A peripheral device read access size register 207 is a register which stores an area of the memory 104 indicating a state of a program being executed by the CPU 101 and/or an access size of the register of the peripheral device 107, the area and access size being subjects to be confirmed its states by the peripheral device read unit 114.

A comparison condition register 208 is a register which is set by the CPU 101 and stores conditions upon comparing a result of reading the memory 104 and/or the register of the peripheral device 107 by the peripheral device read unit 114 and contents of a peripheral device read comparison data register 210 and a peripheral device read mask data register 211 by the state comparator 115. As to the above-mentioned conditions, regarding read results, such a content can be set that bits at positions designated by the peripheral device read mask data register 211 have one or more High bits or one or more Low bits, or that the bits are: matched by 1 bit or more with; completely matched with; not matched with; larger than; larger than or equal to; smaller than; or smaller than or equal to the peripheral device read comparison data register 210.

An operation contents register 209 is a register which stores a pattern of operation contents at the time when the peripheral device read unit 114, the state comparator 115, and the transfer unit 116 operate with being triggered by establishment of a comparison result of the periodic determination by the counter comparator 113. The patterns of operation contents to be set to the operation contents register 209 are as follows.

(1) 209-1

Read is not performed on the memory 104 or the peripheral device 107, but a counter update procedure for updating a value of the peripheral device next read counter value register 205 in accordance with contents of a peripheral device read next cycle adjustment method register 212 described below is performed. Then, after performing a DMA transfer in accordance with contents set in respective registers of a transfer source address register 213 to a transfer size register 221 described below, establishment of the next comparison result of the counter comparator 113 is waited.

(2) 209-2

The counter update procedure for updating a value of the peripheral device next read counter value register 205 in accordance with contents of the peripheral device read next cycle adjustment method register 212 described below is performed. Then, read of the memory 104 or the peripheral device 107 is continued until the comparison conditions of the comparison condition register 208 are established. When the comparison conditions are established, after performing a DMA transfer in accordance with contents set in respective registers of the transfer source address register 213 to the transfer size register 221 described below, establishment of the next comparison result of the counter comparator 113 is waited.

(3) 209-3

Read of the memory 104 or the peripheral device 107 is continued until the comparison conditions of the comparison condition register 208 are established. When the comparison conditions are established, the counter update procedure for updating a value of the peripheral device next read counter value register 205 in accordance with contents of the peripheral device read next cycle adjustment method register 212 described below is performed. Then, after performing a DMA transfer in accordance with contents set in respective registers of the transfer source address register 213 to the transfer size register 221 described below, establishment of the next comparison result of the counter comparator 113 is waited.

(4) 209-4

Read of the memory 104 or the peripheral device 107 is continued until the comparison conditions of the comparison condition register 208 is established. When the comparison conditions are established, a DMA transfer in accordance with contents set in respective registers of the transfer source address register 213 to the transfer size register 221 described below is performed. Then, after performing the counter update procedure for updating the value of the peripheral device next read counter value register 205 in accordance with contents of the peripheral device read next cycle adjustment method register 212 described below, establishment of the next comparison result of the counter comparator 113 is waited.

(5) 209-5

After performing the counter update procedure for updating a value of the peripheral device next read counter value register 205 in accordance with contents of the peripheral device read next cycle adjustment method register 212 described below, read of the memory 104 or the peripheral device 107 is performed. When the comparison conditions of the comparison condition register 208 are not established, establishment of the next comparison result of the counter comparator 113 is waited. When the comparison conditions are established, after performing a DMA transfer in accordance with contents set in respective registers of the transfer source address register 213 to the transfer size register 221 described below, establishment of the next comparison result of the counter comparator 113 is waited.

(6) 209-6

Read of the memory 104 or the peripheral device 107 is performed, and, when the comparison conditions of the comparison condition register 208 are not established, after performing the counter update procedure for updating the value of the peripheral device next read counter value register 205 in accordance with contents of the peripheral device read next cycle adjustment method register 212 described below, establishment of the next comparison result of the counter comparator 113 is waited. When the comparison conditions are established, after performing a DMA transfer in accordance with contents set in respective registers of the transfer source address register 213 to the transfer size register 221 described below, the counter update procedure for updating the value of the peripheral device next read counter value register 205 in accordance with contents of the peripheral device read next cycle adjustment method register 212 described below is performed, and establishment of the next comparison result of the counter comparator 113 is waited.

By having the plurality of patterns of the operation contents as described above, it becomes possible to flexibly set the handling etc. in the case of being unable to transfer, in accordance with a difference in property or operation speed of the peripheral device 107.

The peripheral device read comparison data register 210 is a register which stores data to be subjected to a comparison with data read by the peripheral device read unit 114 in the state comparator 115. The peripheral device read mask data register 211 is a register which stores a range of comparing data read by the peripheral device read unit 114 in the state comparator 115 and data of the peripheral device read comparison data register 210.

The peripheral device read next cycle adjustment method register 212 is a register which stores patterns of a method of adjusting the next cycle of read of the peripheral device 107 by the peripheral device read unit 114. As the patterns of the adjusting method, there are settable patterns such that: (1) there is no next cycle; (2) the peripheral device next read counter value register 205 is updated to a value made by adding a value of the peripheral device read cycle register 204 to a value of the peripheral device read counter value register 203; and (3) the peripheral device next read counter value register 205 is updated to a value made by adding a value of the peripheral device read cycle register 204 to a value of the peripheral device next read counter value register 205. Consequently, it becomes possible to flexibly set the adjusting method of timing of the next cycle, in accordance with a difference in performance or operation speed of the peripheral device 107.

Respective registers of the transfer source address register 213 to the transfer size register 221 are registers for determining a transfer operation of the transfer unit 116.

The transfer source address register 213 is a register which stores an address storing source data of the memory 104 or the peripheral device 107 to be transferred by the transfer unit 116. A transfer destination address register 214 is a register which stores an address of a data storing area of the memory 104 or the peripheral device 107 to be a destination of transfer by the transfer unit 116. A transfer source access size register 215 is a register which stores an access size upon performing read by the transfer unit 116 to the memory 104 or the peripheral device 107 storing the source data. A transfer destination access size register 216 is a register which stores an access size upon performing write by the transfer unit 116 to the memory 104 or the peripheral device 107 to be a destination of write of the transfer data.

A transfer source loop size register 217 is a register which stores a size of an area to read in the case of repeatedly performing transfers. The transfer unit 116 performs a transfer corresponding to a size stored in the register, and then takes an address to be read back to the address stored in the transfer source address register 213. In this manner, the transfer unit 116 can repeatedly read the area of the size stored in the transfer source loop size register 217 as starting from the transfer source address register 213, and thus it becomes possible to transfer large data with using a small area.

A transfer destination loop size register 218 is a register which stores a size of an area to be written in the case of repeatedly performing transfers. The transfer unit 116 performs a transfer corresponding to a size stored in the register, and then takes an address to be written back to the address stored in the transfer destination address register 214. In this manner, the transfer unit 116 can repeatedly write an area of a size stored in the transfer destination loop size register 218 as starting from the transfer destination address register 214, and thus it becomes possible to transfer large data with using a small area.

A transfer source address count direction register 219 is a register which stores a setting either read of the transfer unit 116 is performed in an adding direction or a subtracting direction from the address stored in the transfer source address register 213. A transfer destination address count direction register 220 is a register which stores a setting either write of the transfer unit 116 is performed in an adding direction or a subtracting direction from address stored in the transfer destination address register 214. The transfer size register 221 is a register which stores an amount of data which the transfer unit 116 transfers with one DMA transfer.

Next, a flow of an operation of the DMAC according to the present embodiment will be described below.

First, the CPU 101 obtains usage right of the bus 102 from the arbiter 103, and accesses the register 111 via the bus 102 and the bus IF 110 to set respective registers of the transfer source address register 213 to the transfer size register 221. In this manner, transferred contents upon performing a DMA transfer by the transfer unit 116 are instructed.

Next, the CPU 101 performs settings of respective registers of the peripheral device read counter value register 203 to the peripheral device read next cycle adjustment method register 212 and instructs a periodic operation of the DMAC 108, and a state confirmation method of and how to synchronize between the memory 104 and/or the peripheral device 107.

Next, the CPU 101 sets the operation enable register 201 and the peripheral device read counter enable register 202 to an operation state, starts the counting procedure of the counter 112, and starts operation of the DMAC 108.

From the register 111 to the counter 112, a value of the peripheral device read counter enable register 202 is notified, and the counter 112 starts the counting procedure as the peripheral device read counter enable register 202 is set to the operation state.

Also, from the register 111 to the counter comparator 113, the peripheral device read unit 114, the state comparator 115, and the transfer unit 116, a value of the operation enable register 201 is notified, and, as the operation enable register 201 is set to the operation state, the counter comparator 113 starts a counter comparison procedure to start a comparison of a value of the counter 112 and a value of the peripheral device next read counter value register 205. The peripheral device read unit 114 is in a state of waiting for a comparison result establishment notification from the counter comparator 113, and the state comparator 115 is in a state of waiting for a read result notification from the peripheral device read unit 114, and the transfer unit 116 is in states of waiting for a comparison result notification and a transfer start instruction from the state comparator 115.

The counter 112 continues counting as long as the peripheral device read counter enable register 202 is set to the operation state. To pause the periodic operation of the DMAC 108 temporally, the peripheral device read counter enable register 202 is set to non-operation. In this case, since the counter 112 is temporally paused with storing a count value, measurement is not available during the period of temporal pausing. Temporal pausing can be also made by setting the operation enable register 201 to non-operation and pausing operations of the counter comparator 113, the peripheral device read unit 114, the state comparator 115, and the transfer unit 116. In this case, when the peripheral device read counter enable register 202 is in the operation state, the counter 112 continues counting, and thus time can be measured.

In the comparison of the value of the counter 112 and the value of the peripheral device next read counter value register 205 in the counter comparator 113, when the both values are matched, comparison result establishment of periodic determination is notified to the peripheral device read unit 114.

After the peripheral device read unit 114 receives the notification of comparison result establishment of periodic determination from the counter comparator 113, the peripheral device read unit 114 and the state comparator 115 start a periodic operation in accordance with the setting contents of the operation contents register 209. FIGS. 3 to 8 are flow charts illustrating flows of a peripheral device reading procedure, a state comparison procedure, and a counter update procedure. Hereinafter, setting contents of the operation contents register 209 will be described in each setting content.

Figure 3:
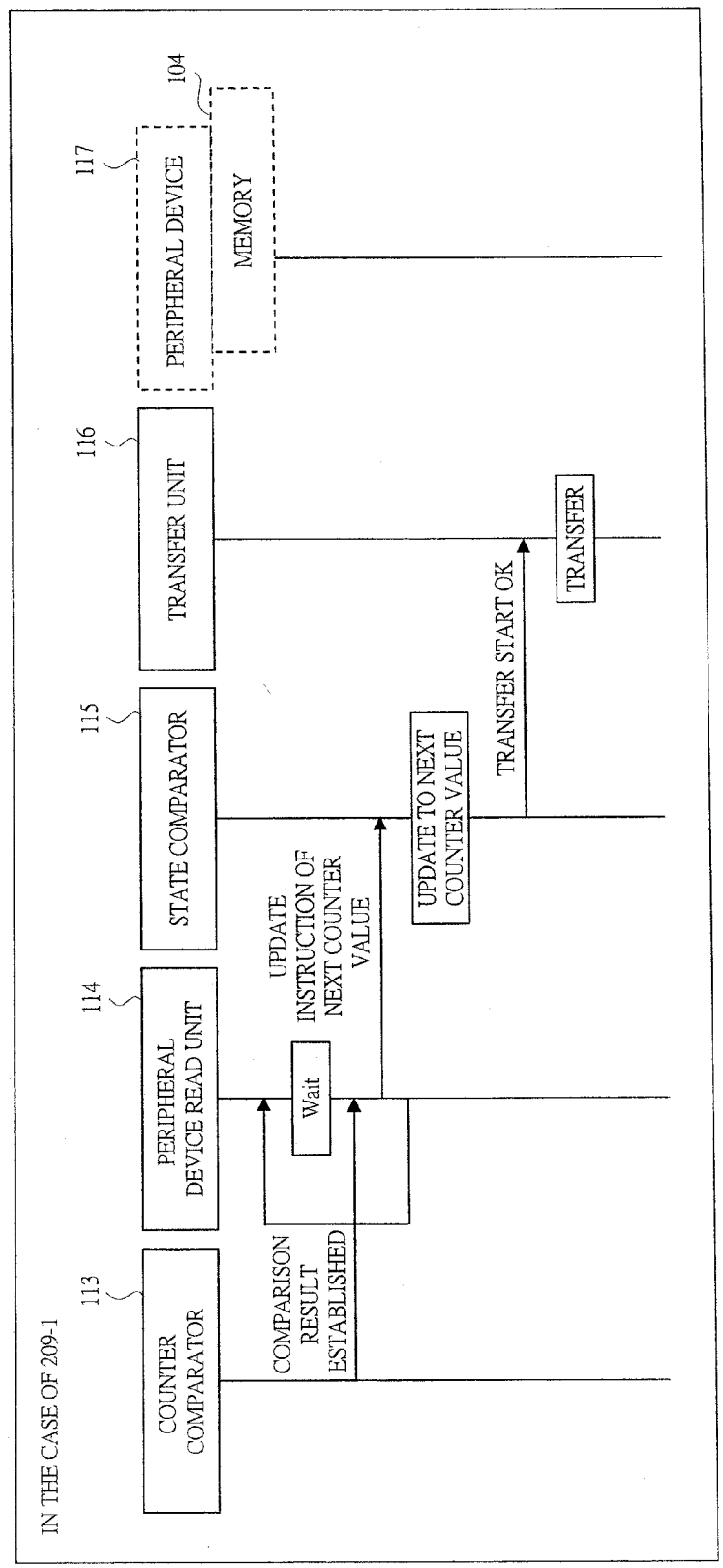
FIG. 3 is a flow chart illustrating a flow of a peripheral device read procedure, a state comparison procedure, and a counter update procedure in the DMAC according to the first embodiment of the present invention.

(1) In the Case of 209-1 (FIG. 3)

The peripheral device read unit 114 does not perform read but notifies an update instruction of the peripheral device next read counter value register 205 to the state comparator 115, and gets back to the state of waiting for the notification of the next comparison result establishment from the counter comparator 113.

The state comparator 115, when receiving the update instruction of the peripheral device next read counter value register 205 from the peripheral device read unit 114, updates the value of the peripheral device next read counter value register 205 based on values of respective registers of the peripheral device read counter value register 203 to the peripheral device next read counter value register 205 in accordance with contents of the peripheral device read next cycle adjustment method register 212, and notifies transfer start condition establishment to the transfer unit 116.

Figure 4:
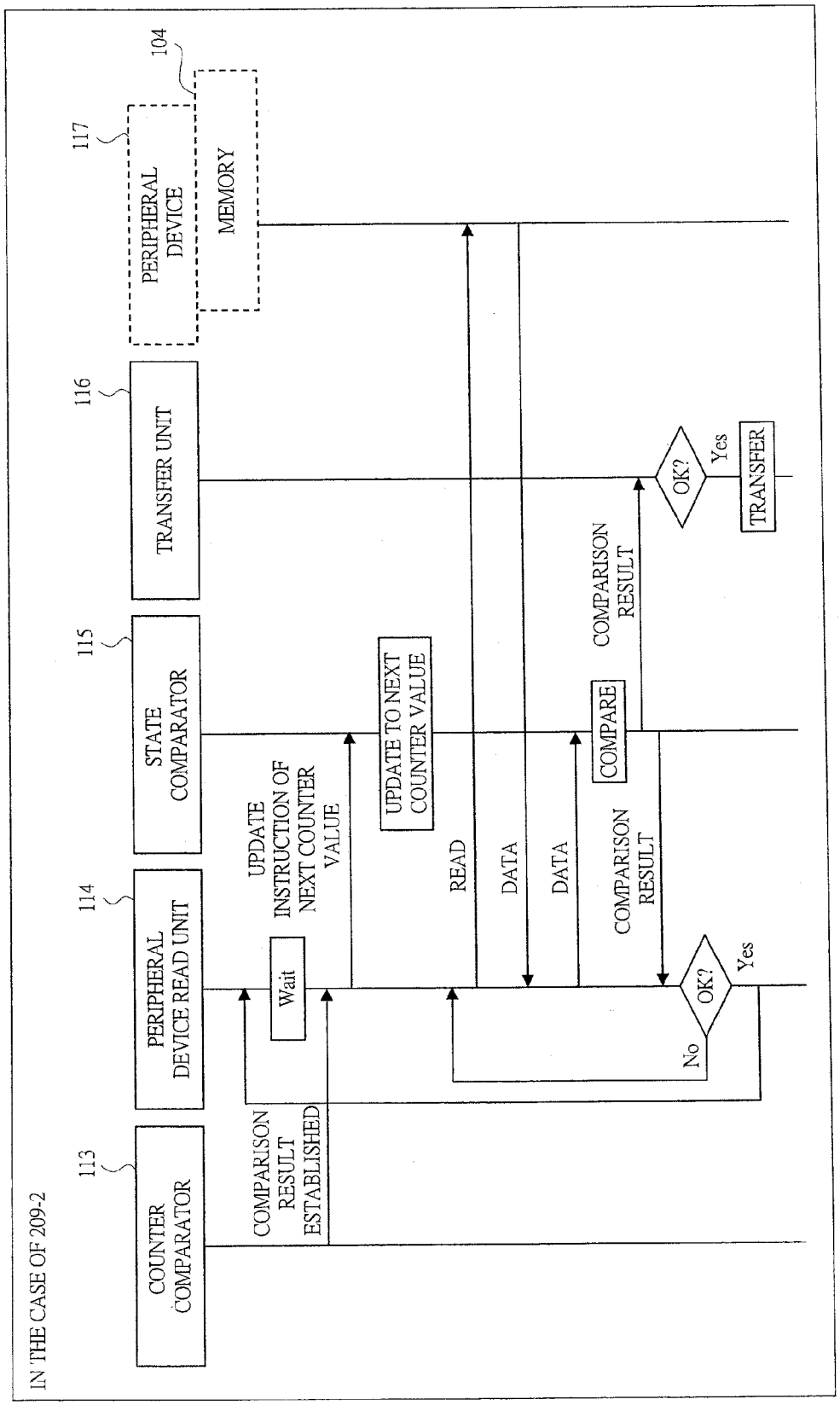
FIG. 4 is a flow chart illustrating a flow of a peripheral device read procedure, a state comparison procedure, and a counter update procedure in the DMAC according to the first embodiment of the present invention.

(2) In the Case of 209-2 (FIG. 4)

The peripheral device read unit 114 notifies an update instruction of the peripheral device next read counter value register 205 to the state comparator 115. Next, the peripheral device read unit 114 performs read to the address stored in the peripheral device read address register 206 as corresponding to an access size stored in the peripheral device read access size register 207, passes the read data to the state comparator 115, and receives a comparison result of the same. Read is repeated until the comparison result is established, and when the comparison result is established, the peripheral device read unit 114 gets back to the state of waiting for notification of the next comparison result establishment from the counter comparator 113.

The state comparator 115, when receiving an update instruction of the peripheral device next read counter value register 205 from the peripheral device read unit 114, updates the value of the peripheral device next read counter value register 205 based on the values of respective registers of the peripheral device read counter value register 203 to the peripheral device next read counter value register 205 in accordance with contents of the peripheral device read next cycle adjustment method register 212. Also, when read data is received from the peripheral device read unit 114, in accordance with setting contents of the comparison condition register 208 and the comparison range stored in the peripheral device read mask register 211, the state comparator 115 compares the contents of the peripheral device read comparison data register 210 and the read data, and notifies a comparison result to the peripheral device read unit 114 and the transfer unit 116.

Figure 5:
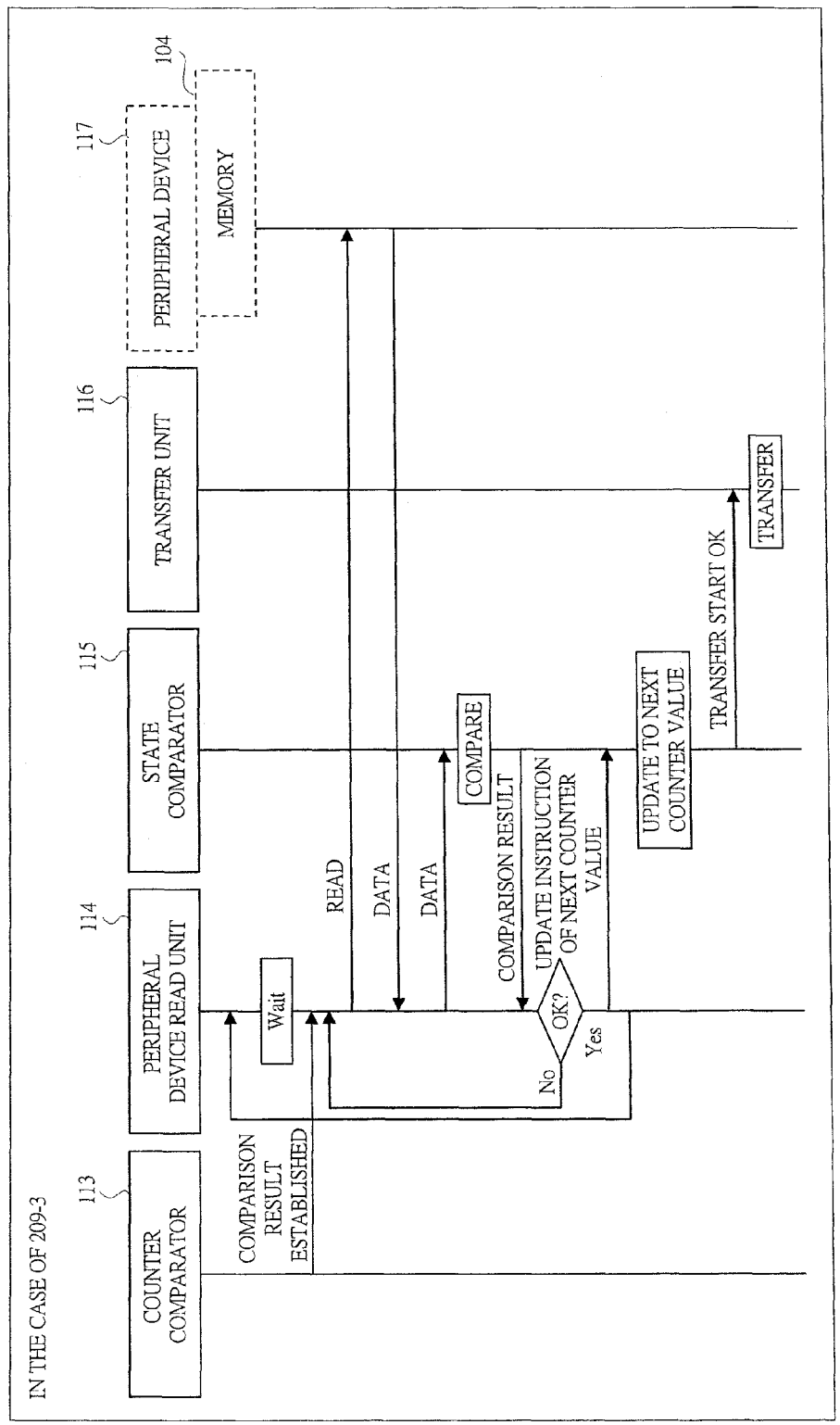
FIG. 5 is a flow chart illustrating a flow of peripheral device read procedure, a state comparison procedure, and a counter update procedure in the DMAC according to the first embodiment of the present invention.

(3) In the Case of 209-3 (FIG. 5)

The peripheral device read unit 114 performs read to the address stored in the peripheral device read address register 206 as corresponding to the access size stored in the peripheral device read access size register 207, passes the read data to the state comparator 115, and receives a comparison result of the same. Read is repeated until the comparison result is established, and when the comparison result is established, the peripheral device read unit 114 notifies an update instruction of the peripheral device next read counter value register 205 to the state comparator 115, and gets back to the state of waiting for the next comparison result establishment from the counter comparator 113.

The state comparator 115, when receiving read data from the peripheral device read unit 114, compares the contents of the peripheral device read comparison data register 210 and the read data in accordance with setting contents of the comparison condition register 208 and the comparison range stored in the peripheral device read mask register 211, and notifies a comparison result to the peripheral device read unit 114. Also, the state comparator 115, when receiving an update instruction of the peripheral device next read counter value register 205, updates the value of the peripheral device next read counter value register 205 based on the values of respective registers of the peripheral device read counter value register 203 to the peripheral device next read counter value register 205, and notifies transfer start condition establishment to the transfer unit 116 in accordance with the contents of the peripheral device read next cycle adjustment method register 212.

Figure 6:
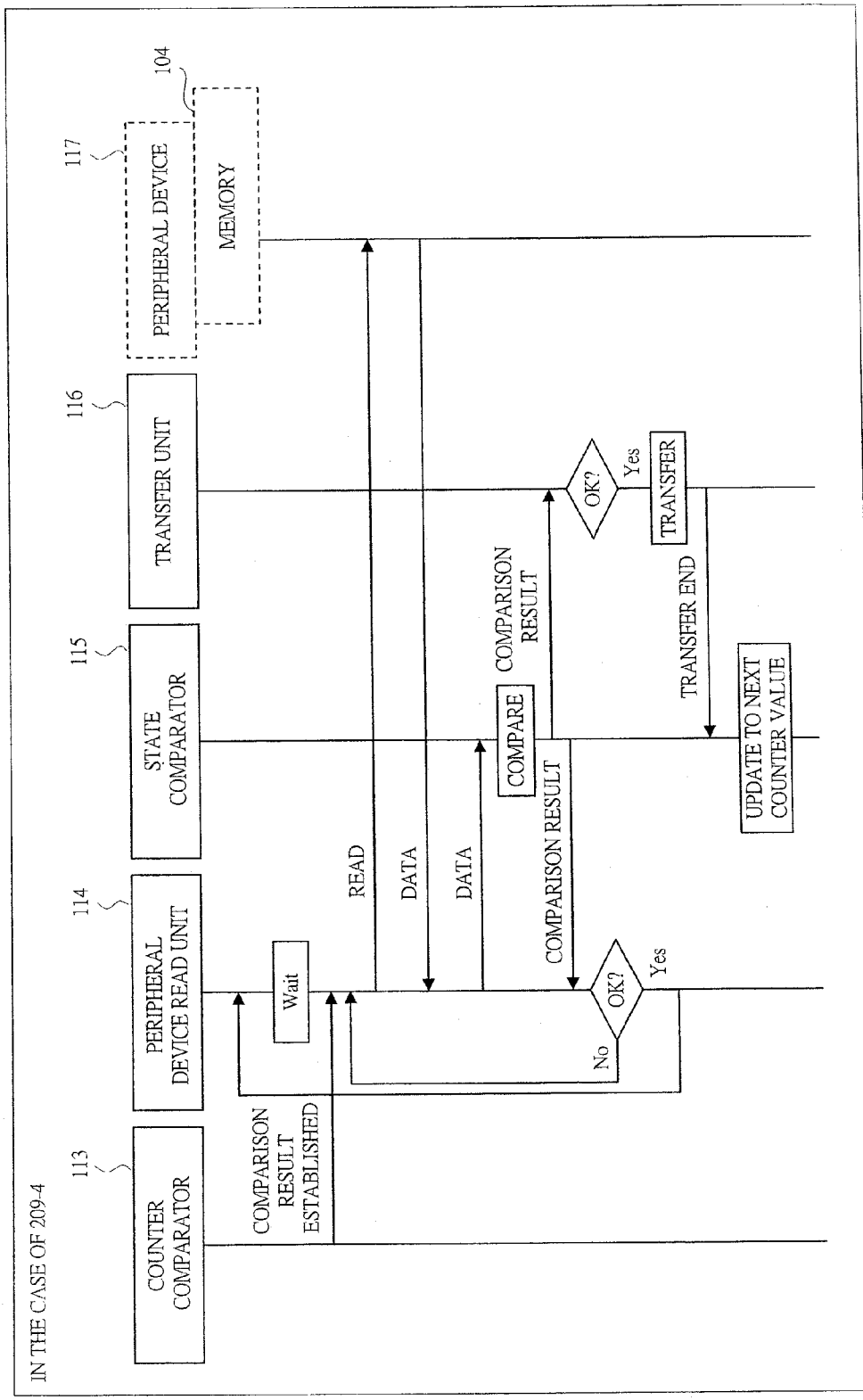
FIG. 6 is a flow chart illustrating a flow of a peripheral device read procedure, a state comparison procedure, and a counter update procedure in the DMAC according to the first embodiment of the present invention.

(4) In the Case of 209-4 (FIG. 6)

The peripheral device read unit 114 performs read to the address stored in the peripheral device read address register 206 as corresponding to the access size stored in the peripheral device read access size register 207, and passes the read data to the state comparator 115 and receives a comparison result of the same. Read is repeated until the comparison result is established, and when the comparison result is established, the peripheral device read unit 114 gets back to the state of waiting for a notification of next comparison result establishment from the counter comparator 113.

The state comparator 115, when receiving the read data from the peripheral device read unit 114, compares the contents of the peripheral device read comparison data register 210 and the read data in accordance with the setting contents of the comparison condition register 208 and the comparison range stored in the peripheral device read mask register 211, and notifies a comparison result to the peripheral device read unit 114 and the transfer unit 116. Also, the state comparator 115, when receiving a transfer termination notification from the transfer unit 116, updates the value of the peripheral device next read counter value register 205 based on the values of respective registers of the peripheral device read counter value register 203 to the peripheral device next read counter value register 205 in accordance with the contents of the peripheral device read next cycle adjustment method register 212.

Figure 7:
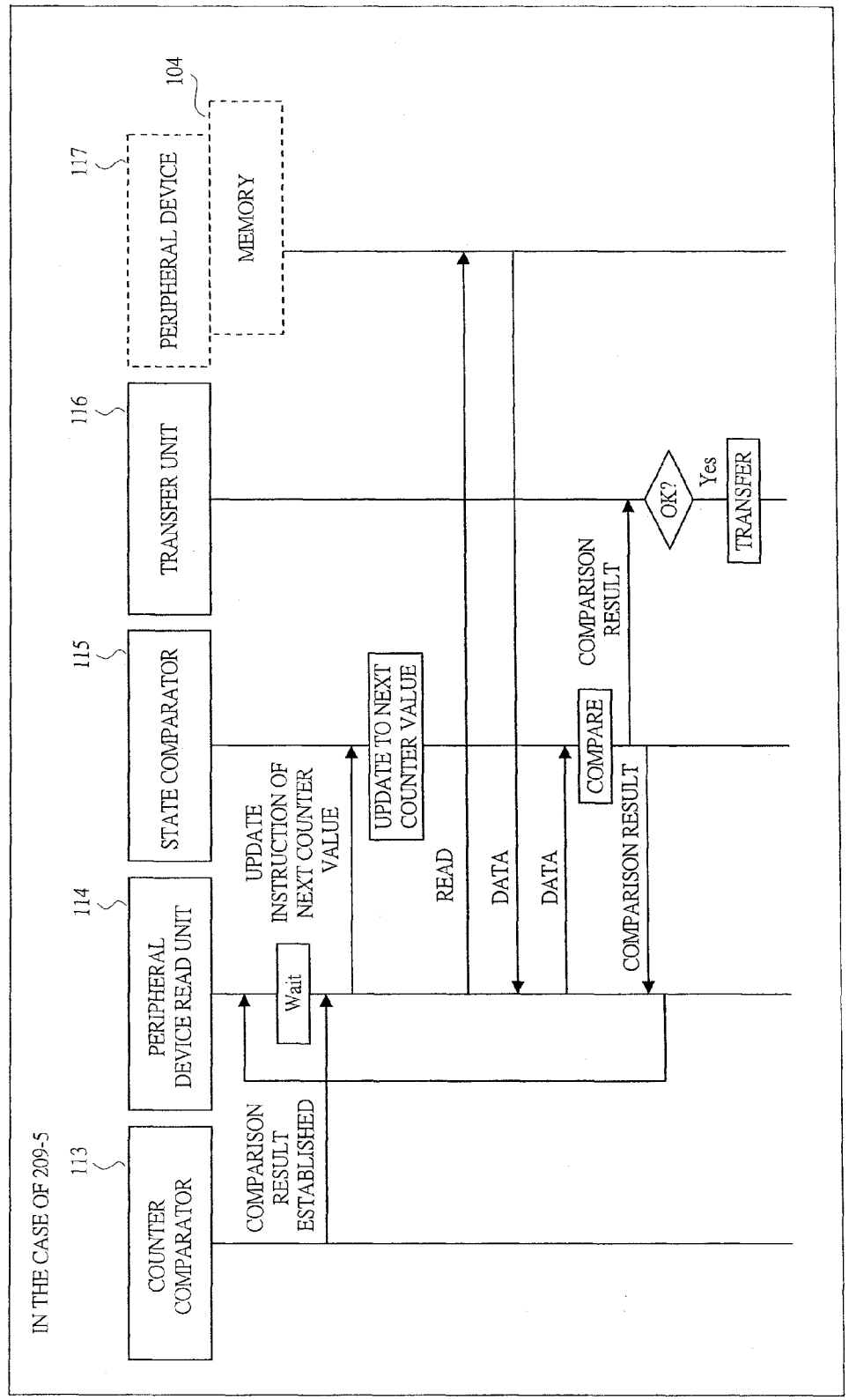
FIG. 7 is a flow chart illustrating a flow of a peripheral device read procedure, a state comparison procedure, and a counter update procedure in the DMAC according to the first embodiment of the present invention.

(5) In the Case of 209-5 (FIG. 7)

The peripheral device read unit 114 notifies an update instruction of the peripheral device next read counter value register 205 to the state comparator 115. Next, the peripheral device read unit 114 performs read to the address stored in the peripheral device read address register 206 as corresponding to the access size stored in the peripheral device read access size register 207, passes the read data to the state comparator 115, and receives a comparison result of the same, and then, gets back to the state of waiting for a notification of the next comparison result establishment from the counter comparator 113.

The state comparator 115, when receiving an update instruction of the peripheral device next read counter value register 205 from the peripheral device read unit 114, updates the value of the peripheral device next read counter value register 205 based on the values of respective registers of the peripheral device read counter value register 203 to the peripheral device next read counter value register 205 in accordance with the contents of the peripheral device read next cycle adjustment method register 212. Also, the state comparator 115, when read data from the peripheral device read unit 114 is received, compares the contents of the peripheral device read comparison data register 210 and the read data in accordance with the setting contents of the comparison condition register 208 and the comparison range stored in the peripheral device read mask register 211, and notifies a comparison result to the peripheral device read unit 114 and the transfer unit 116.

Figure 8:
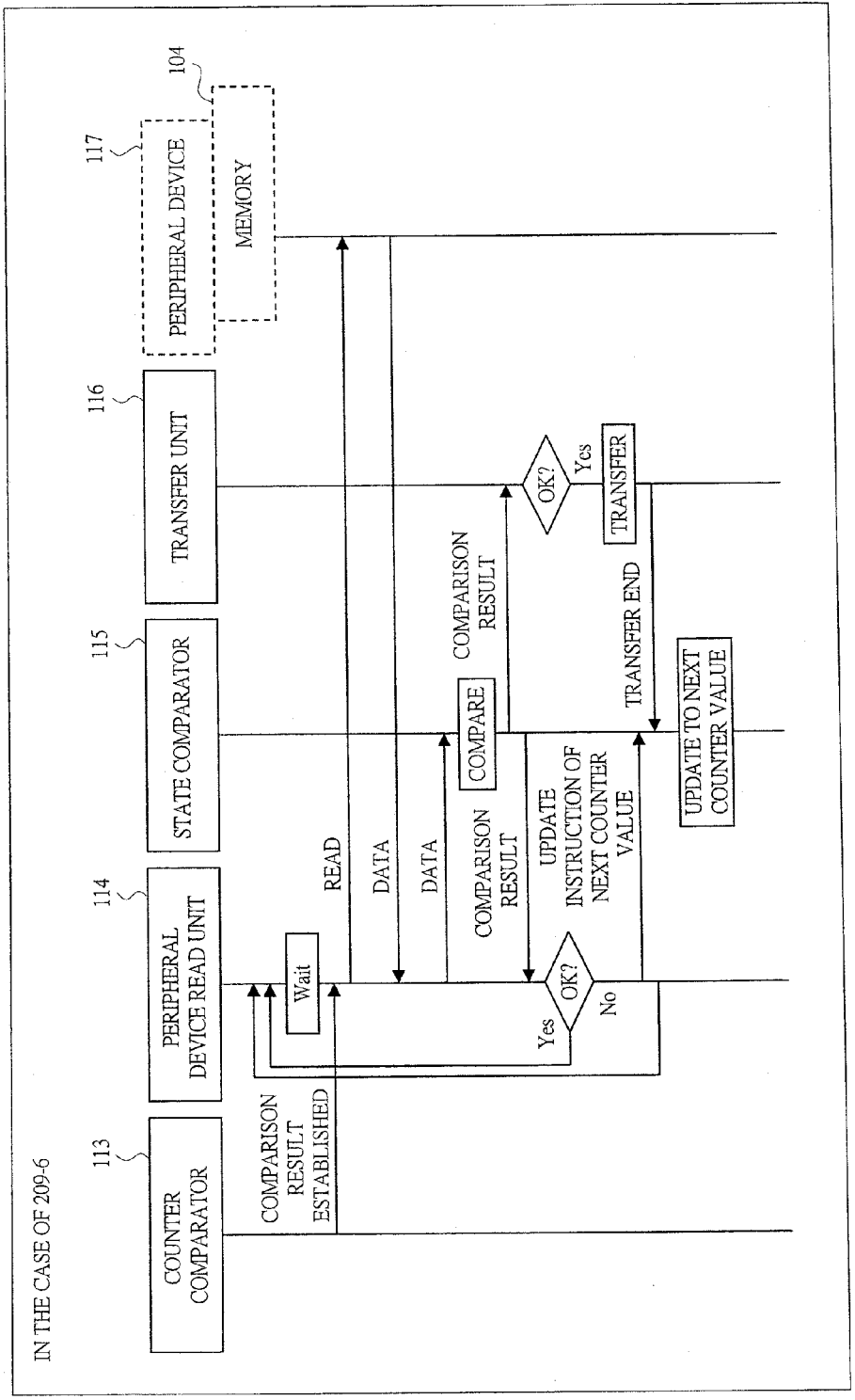
FIG. 8 is a flow chart illustrating a flow of a peripheral device read procedure, a state comparison procedure, and a counter update procedure in the DMAC according to the first embodiment of the present invention.

(6) In the Case of 209-6 (FIG. 8)

The peripheral device read unit 114 performs read to the address stored in the peripheral device read address register 206 as corresponding to the access size stored in the peripheral device read access size register 207, and passes the read data to the state comparator 115 and receives a comparison result of the same. When the comparison result is not established, the peripheral device read unit 114 notifies an update instruction of the peripheral device next read counter value register 205 to the state comparator 115, and then, gets back to the state of waiting for the next comparison result establishment from the counter comparator 113. When the comparison result is established, the peripheral device read unit 114 gets back to the state of waiting for the next comparison result establishment from the counter comparator 113.

The state comparator 115, when receiving read data from the peripheral device read unit 114, compares the contents of the peripheral device read comparison data register 210 and the read data in accordance with the setting contents of the comparison condition register 208 and the comparison range stored in the peripheral device read mask register 211, and notifies a comparison result to the peripheral device read unit 114 and the transfer unit 116. Also, the state comparator 115, when receiving either the update notification of the peripheral device next read counter value register 205 from the peripheral device read unit 114 or the transfer termination notification from the transfer unit 116, updates the value of the peripheral device next read counter value register 205 based on the values of respective registers of the peripheral device read counter value register 203 to the peripheral device next read counter value register 205 in accordance with the contents of the peripheral device read next cycle adjustment method register 212.

With being triggered by the transfer start condition establishment or the notification of a comparison result received from the state comparator 115 by the operation described above, the transfer unit 116 starts operation of a DMA transfer. When the comparison result is received from the state comparator 115, the DMA transfer is performed only when the comparison result is established.

First, in a direction set in the transfer source address count direction register 219 as starting from address stored in the transfer source address register 213, data in an area of a size stored in the transfer source loop size register 217 or the transfer size register 221 is read.

Next, in a direction set in the transfer destination address count direction register 220 as starting from the address stored in the transfer destination address register 214, the read data is written to an area of the size stored in the transfer destination loop size register 218 or the transfer size register 221.

At this time, a unit of read is the access size stored in the transfer source access size register 215, and the address is updated sequentially as corresponding to the access size and in the direction set in the transfer source address count direction register 219, and the address is got back to the address stored in the transfer source address register 213 every time the transfer is performed as corresponding to the size stored in the transfer source loop size register 217.

Also, a unit of write is the access size stored in the transfer destination access size register 216, and the address is updated sequentially as corresponding to the access size and in the direction set in the transfer destination address count direction register 220, and the address is got back to the address stored in the transfer destination address register 214 every time the transfer is performed as corresponding to the size stored in the transfer destination loop size register 218.

In this manner, by enabling repeated accesses to the same address, a transfer targeting program executed by the CPU 101, two-face buffer which the peripheral device 107 manages, and/or a ring buffer etc. is enabled.

As described above, in the DMAC 108 according to the present embodiment, as respective function blocks operate in accordance with the contents of the register 111 set by the CPU 101, periodic DMA transfers can be performed with confirming a progress state of the program which the CPU 101 executes and operation state of the peripheral device 107, and jitter in the operation cycle can be handled as synchronizing with these states.

Also, once the setting of the periodic operation is performed to the DMAC 108, the DMAC 108 can perform the periodic operation independently, and therefore, it is unnecessary to confirm the state of the memory 104 and/or the peripheral device 107 and prepare interrupt program and/or polling program for adjusting timing of the DMA transfer as the program which the CPU 101 executes. Therefore, program for operating the interrupt program and/or polling program being coexistent with application programs at the same time is unnecessary, and thus the capacity of a memory and/or storage for storing the program can be reduced.

Further, since the interrupt program and/or polling program is unnecessary to be executed while application program is executed by the CPU 101, a cache hit rate of the application program is improved, and an improvement of system performance can be achieved. Similarly, since context switching for executing the interrupt program and/or polling program is not generated in the CPU 101, an overhead of several tens of ms (milliseconds) for the context switching can be eliminated, and thus the operation efficiency of the CPU 101 can be improved.

Still further, since the DMAC 108 independently performs the periodic operation with using hardware, response time to change of time and/or a state of the peripheral device can be several ns (nanoseconds) to several tens of ns for obtaining bus right in contrast to several ms to several tens of ms in the case of performing only by the CPU 101, and thus high real-time property can be achieved without getting high functionality of the CPU 101 or multi-CPU which costs a lot.

Moreover, each unit of the counter 112, the counter comparator 113, the state comparator 115 etc. can be mounted by hardware of smaller scale than the CPU 101 and/or a high-function circuit of the CPU 101, and thus low power consumption and low cost become possible. In addition, since the interval of the DMA transfer is determined in a periodic fashion and the DMAC 108 itself determines the interval independently, clock in the transfer unit 116 can be paused during a period in which the DMA transfer is not performed, and thus further low power consumption becomes possible.

Second Embodiment

A DMA controller with peripheral device state confirmation function (hereinafter, called "DMAC") of a second embodiment of the present invention will be described with reference to FIGS. 9 and 10.

Figure 9:
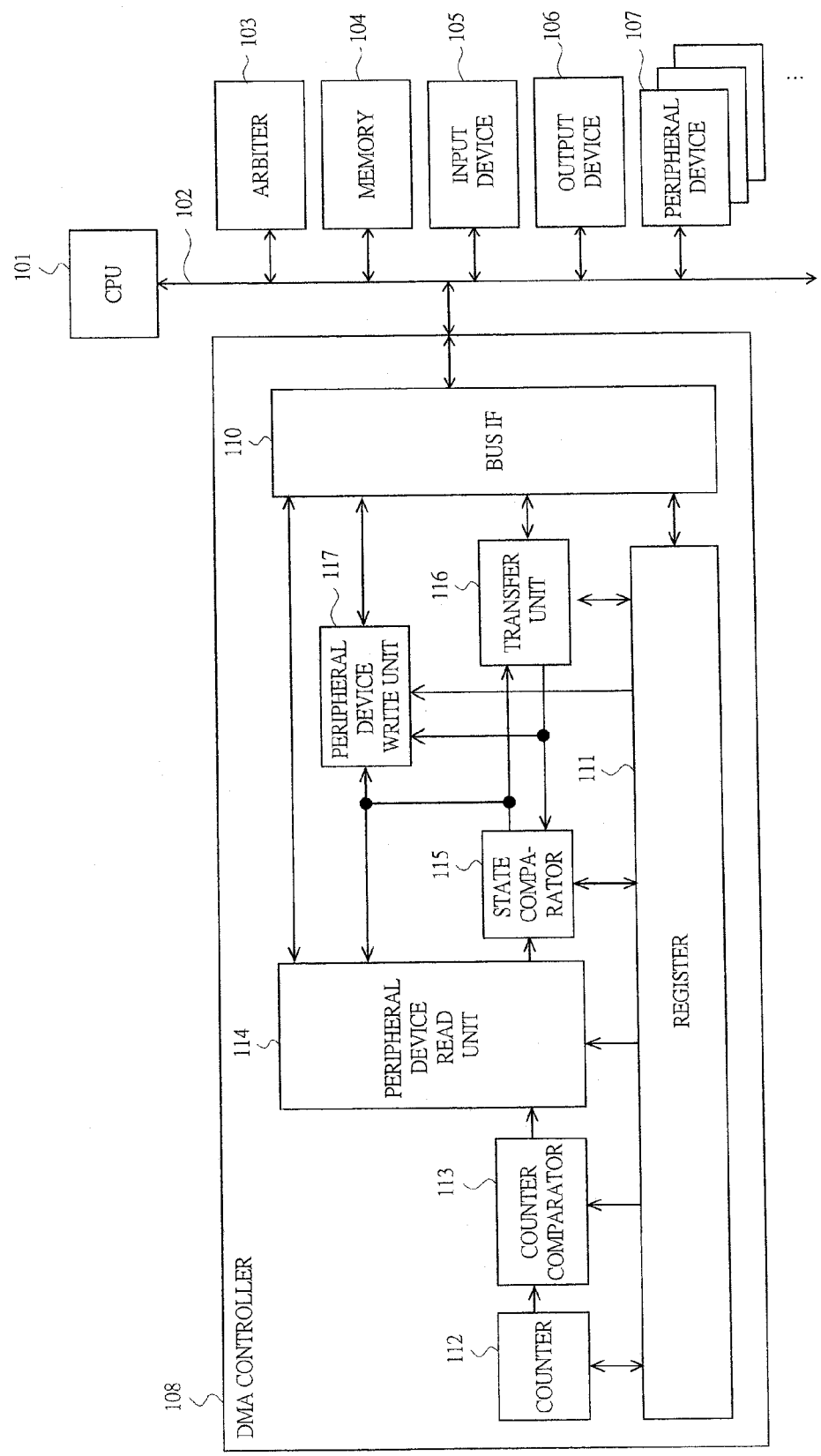
FIG. 9 is a function block diagram illustrating a configuration of a computer system mounting a DMAC according to a second embodiment of the present invention.

FIG. 9 is a function block diagram illustrating a configuration of a computer system mounting the DMAC according to the present embodiment. The DMAC 108 according to the present embodiment has a configuration in which a peripheral device write unit 117 is added to the DMAC 108 illustrated in FIG. 1 of the first embodiment.

The peripheral device write unit 117, upon start or after end of a DMA transfer, performs a peripheral device write procedure for performing write to a register of the memory 104 and/or the peripheral device 107 in accordance with contents of instruction of the register 111 set by the CPU 101. In this manner, the DMAC 108 according to the present embodiment can perform not only confirmation of the state(s) of the peripheral device 107 and/or the program which the CPU 101 executes, but also control of the state(s).

Figure 10:
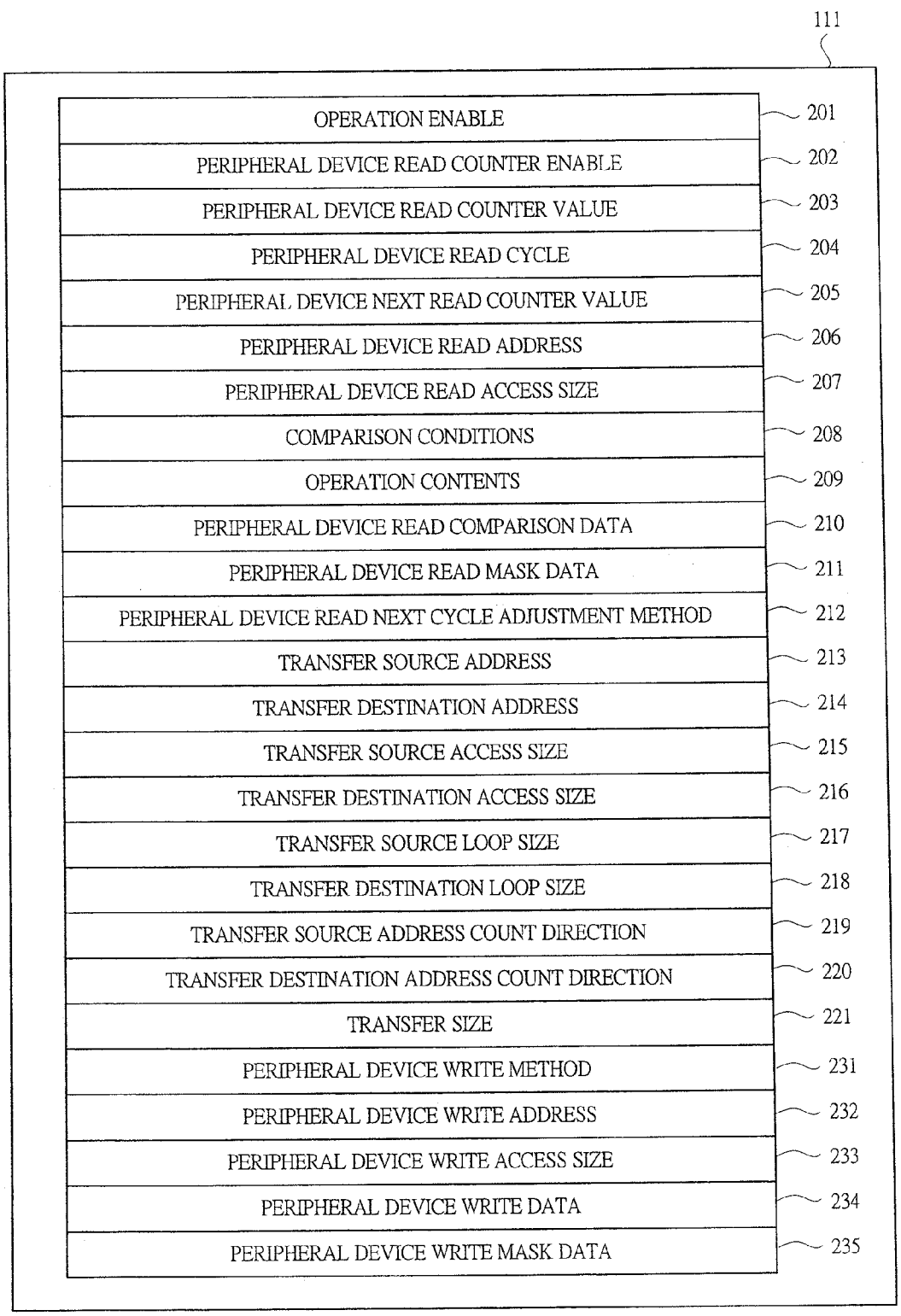
FIG. 10 is a diagram illustrating a configuration of registers according to the second embodiment of the present invention.

FIG. 10 is a diagram illustrating a configuration of registers which the register 111 has in the DMAC 108 according to the present embodiment. In FIG. 10, respective registers of a peripheral device write method register 231 to a peripheral device write mask data register 235 are registers which are added to the configuration of the register 111 illustrated in FIG. 2 of the first embodiment along with the addition of the peripheral device write unit 117.

A peripheral device write address register 232 is a register which stores address of a register of the memory 104 and/or the peripheral device 107 for performing control of executing program of the CPU 101 and/or the peripheral device 107 by the DMAC 108.

The peripheral device write access size register 233 is a register which stores an access size of the register of the memory 104 and/or the peripheral device 107, the peripheral device write data register 234 is a register which stores data to be written to the register of the memory 104 and/or the peripheral device 107, and the peripheral device write mask data register 235 is a register which assigns a range of data to be written to the register of the memory 104 and/or the peripheral device 107.

The peripheral device write method register 231 is a register which stores patterns of a method of writing to the register of the memory 104 and/or the peripheral device 107. The patterns to be set to the peripheral device write method register 231 are as follows.

(1) 231-1

After the transfer unit 116 completes a unit transfer, data stored in the peripheral device write data register 234 is written to an address stored in the peripheral device write address register 232, as corresponding to an access size stored in the peripheral device write access size register 233, and in a range stored in the peripheral device write mask data register 235.

(2) 231-2

After the transfer unit 116 completes a unit transfer, a result of XOR with data stored in the peripheral device write data register 234 is written to the address stored in the peripheral device write address register 232, as corresponding to an access size stored in the peripheral device write access size register 233, and in a range stored in the peripheral device write mask data register 235.

(3) 231-3

After the transfer unit 116 completes a unit transfer, a result of OR with data stored in the peripheral device write data register 234 is written to address stored in the peripheral device write address register 232, as corresponding to an access size stored in the peripheral device write access size register 233, and in a range stored in the peripheral device write mask data register 235.

(4) 231-4

After the transfer unit 116 completes a unit transfer, a result of OR with data stored in the peripheral device write data register 234 is written to the address stored in the peripheral device write address register 232, as corresponding to an access size stored in the peripheral device write access size register 233, and in a range stored in the peripheral device write mask data register 235.

(5) 231-5

When the transfer unit 116 starts a unit transfer, data stored in the peripheral device write data register 234 is written to the address stored in the peripheral device write address register 232, as corresponding to an access size stored in the peripheral device write access size register 233, and in a range stored in the peripheral device write mask data register 235.

(6) 231-6

When the transfer unit 116 starts a unit transfer, a result of XOR with the data stored in the peripheral device write data register 234 is written to the address stored in the peripheral device write address register 232, as corresponding to an access size stored in the peripheral device write access size register 233, and in a range stored in the peripheral device write mask data register 235.

(7) 231-7

When the transfer unit 116 starts a unit transfer, a result of OR with the data stored in the peripheral device write data register 234 is written to address stored in the peripheral device write address register 232, as corresponding to an access size stored in the peripheral device write access size register 233, and in a range stored in the peripheral device write mask data register 235.

(8) 231-8

When the transfer unit 116 starts a unit transfer, a result of AND with data stored in the peripheral device write data register 234 is written to address stored in the peripheral device write address register 232, as corresponding to an access size stored in the peripheral device write access size register 233, and in a range stored in the peripheral device write mask data register 235.

According to the settings of patterns as described above, assignments of maintaining, inverting, and ON/OFF of data of a subject bit(s) to the register of the memory 104 and/or the peripheral device 107 are possible, and consequently, notification of the state etc. of the DMA transfer and control can be performed to the executing program of the CPU 101 and/or the peripheral device 107.

Next, contents of operation of the peripheral device write unit 117 will be described hereinafter.

The peripheral device write unit 117 receives completion notification of a unit transfer from the transfer unit 116 or a notification of a comparison result from the state comparator 115, and data stored in the peripheral device write data register 234 is written in accordance with a method set in the peripheral device write method register 231, to an address stored in the peripheral device write address register 232, as corresponding to a size stored in the peripheral device write access size register 233, and only in a range stored in the peripheral device write mask data register 235.

Each write procedure per the method set in the peripheral device write method register 231 is as follows.

(1) In the Case of 231-1

The peripheral device write unit 117 waits for a completion notification of a unit transfer from the transfer unit 116, and when it receives the completion notification of the unit transfer, it performs read from the address stored in the peripheral device write address register 232 as corresponding to an access size stored in the peripheral device write access size register 233. Among the read data, the data in a range stored in the peripheral device write mask data register 235 is replaced by the data stored in the peripheral device write data register 234, and the data is written back to the address stored in the peripheral device write address register 232 as corresponding to the access size stored in the peripheral device write access size register 233.

(2) In the Case of 231-2

The peripheral device write unit 117 waits for a completion notification of a unit transfer from the transfer unit 116, and when it receives the completion notification of the unit transfer, it performs read from the address stored in the peripheral device write address register 232 as corresponding to an access size stored in the peripheral device write access size register 233. Among the read data, the data in a range stored in the peripheral device write mask data register 235 is replaced by a value XOR-ed with the data stored in the peripheral device write data register 234, and the data is written back to the address stored in the peripheral device write address register 232 as corresponding to the access size stored in the peripheral device write access size register 233.

(3) In the Case of 231-3

The peripheral device write unit 117 waits for a completion notification of a unit transfer from the transfer unit 116, and when it receives the completion notification of the unit transfer, it performs read from the address stored in the peripheral device write address register 232 as corresponding to an access size stored in the peripheral device write access size register 233. Among the read data, the data in a range stored in the peripheral device write mask data register 235 is replaced by a value OR-ed with the data stored in the peripheral device write data register 234, and the data is written back to the address stored in the peripheral device write address register 232 as corresponding to the access size stored in the peripheral device write access size register 233.

(4) In the Case of 231-4

The peripheral device write unit 117 waits for a completion notification of a unit transfer from the transfer unit 116, and when it receives the completion notification of the unit transfer, it performs read from address stored in the peripheral device write address register 232 as corresponding to an access size stored in the peripheral device write access size register 233. Among the read data, the data in a range stored in the peripheral device write mask data register 235 is replaced by a value AND-ed with data stored in the peripheral device write data register 234, and the data is written back to the address stored in the peripheral device write address register 232 as corresponding to the access size stored in the peripheral device write access size register 233.

(5) In the Case of 231-5

The peripheral device write unit 117 waits for a notification of a comparison result from the state comparator 115, and when it receives a notification that the comparison result is established, it performs read from the address stored in the peripheral device write address register 232 as corresponding to an access size stored in the peripheral device write access size register 233. Among the read data, the data in a range stored in the peripheral device write mask data register 235 is replaced by the data stored in the peripheral device write data register 234, and the data is written back to the address stored in the peripheral device write address register 232 as corresponding to the access size stored in the peripheral device write access size register 233.

(6) In the Case of 231-6

The peripheral device write unit 117 waits for a notification of a comparison result from the state comparator 115, and when it receives a notification that the comparison result is established, it performs read from the address stored in the peripheral device write address register 232 as corresponding to an access size stored in the peripheral device write access size register 233. Among the read data, the data in a range stored in the peripheral device write mask data register 235 is replaced by a value XOR-ed with the data stored in the peripheral device write data register 234, and the data is written back to the address stored in the peripheral device write address register 232 as corresponding to the access size stored in the peripheral device write access size register 233.

(7) In the Case of 231-7

The peripheral device write unit 117 waits for a notification of a comparison result from the state comparator 115, and when it receives a notification that the comparison result is established, it performs read from the address stored in the peripheral device write address register 232 as corresponding to an access size stored in the peripheral device write access size register 233. Among the read data, the data in a range stored in the peripheral device write mask data register 235 is replaced by a value OR-ed with the data stored in the peripheral device write data register 234, and the data is written back to the address stored in the peripheral device write address register 232 as corresponding to the access size stored in the peripheral device write access size register 233.

(8) In the Case of 231-8

The peripheral device write unit 117 waits for a notification of a comparison result from the state comparator 115, and when it receives a notification that the comparison result is established, it performs read from the address stored in the peripheral device write address register 232 as corresponding to an access size stored in the peripheral device write access size register 233. Among the read data, the data in a range stored in the peripheral device write mask data register 235 is replaced by a value AND-ed with the data stored in the peripheral device write data register 234, and the data is written back to the address stored in the peripheral device write address register 232 as corresponding to the access size stored in the peripheral device write access size register 233.

As described in the foregoing, in the DMAC 108 according to the present embodiment, as respective function blocks operate in accordance with contents of the register 111 set by the CPU 101, a periodic DMA transfer is performed with confirming the progress state of the program which the CPU 101 executes and/or the operation state of the peripheral device 107 and more flexibly synchronizing with these state(s) by notifying the state of the DMA transfer and/or performing control to these states, so that jitters in the operation cycle can be handled.

Third Embodiment

A DMA controller with peripheral device state confirmation function (hereinafter, called "DMAC") of a third embodiment of the present invention will be described with reference to FIG. 11. The DMAC according to the present embodiment handles DMA transfers in a plurality of cycles and among a plurality of peripheral devices.

A configuration of a computer system mounting the DMAC according to the present embodiment is the same with that in FIG. 1 of the first embodiment or that in FIG. 9 of the second embodiment.

FIG. 11 is a diagram illustrating a configuration of registers which the register 111 has in the DMAC 108 in the case of using the configuration in FIG. 9 of the second embodiment. In the DMAC 108 according to the present embodiment, to define a second periodic transfer, respective registers of a peripheral device read cycle register 304 to a transfer size register 321, and a peripheral device write method register 331 to a peripheral device write mask data register 335 are added to the register 111.

Contents of the registers added to define the second periodic transfer are the same with those of respective registers of peripheral device read cycle register 204 to the transfer size register 221, and the peripheral device write method register 231 to the peripheral device write mask data register 235 for defining a first periodic transfer.

In addition, to the notification of a comparison result passed from the counter comparator 113 to the peripheral device read unit 114, information for discriminating either the conditions of the first periodic transfer or the conditions of the second periodic transfer is established is added to extend. Accordingly, the peripheral device read unit 114 determines to perform read either with reference to the register defining the first periodic transfer or with reference to the register defining the second periodic transfer, and reads the memory 104 or the peripheral device 107, and passes the read data to the state comparator 115. At this time, the data is notified with adding information discriminating either the data relating to the first periodic transfer or the data relating to the second periodic transfer.

The state comparator 115, with using the added discriminating information, determines to use either the register defining the first periodic transfer or the register defining the second periodic transfer as data to be compared, and adds discriminating information indicating which register defining a periodic transfer is used to perform a comparison, and notifies a comparison result to the peripheral device read unit 114, the peripheral device write unit 117, and the transfer unit 116. The peripheral device write unit 117 and the transfer unit 116 similarly select a register to be used with using the added discriminating information to operate.

As described above, by the DMAC 108 according to the present embodiment, DMA transfers in a plurality of cycles and among a plurality of peripheral devices can be handled at the same time. Also, while the DMAC 108 according to the present embodiment has the configuration including registers defining two periodic transfers, the first and second periodic transfers, it is possible to further increase the number of periodic transfers handled at the same time by further adding registers defining a third and following periodic transfers.

Fourth Embodiment

A DMA controller with peripheral device state confirmation function (hereinafter, called "DMAC") of a fourth embodiment of the present invention will be described with reference to FIGS. 12 and 13. The DMAC according to the present embodiment uses a descriptor to handle DMA transfers in a plurality of cycles and among a plurality of peripheral devices. The descriptor retains contents defining a periodic operation on a memory instead of a register.

A configuration of a computer system mounting the DMAC according to the present embodiment is the same with the configuration in FIG. 1 of the first embodiment and that in FIG. 9 of the second embodiment.

FIG. 12 is a diagram illustrating a configuration of registers which the register 111 has in the DMAC 108 in the case of employing the configuration in FIG. 9 of the second embodiment. In FIG. 12, an operation description address register 241 is a register which is added to the configuration of the register 111 illustrated in FIG. 10 of the second embodiment along with defining the descriptor. The operation description address register 241 stores address of the memory 104 in which the descriptor of the configuration illustrated in FIG. 13 described below is stored.

Figure 13:
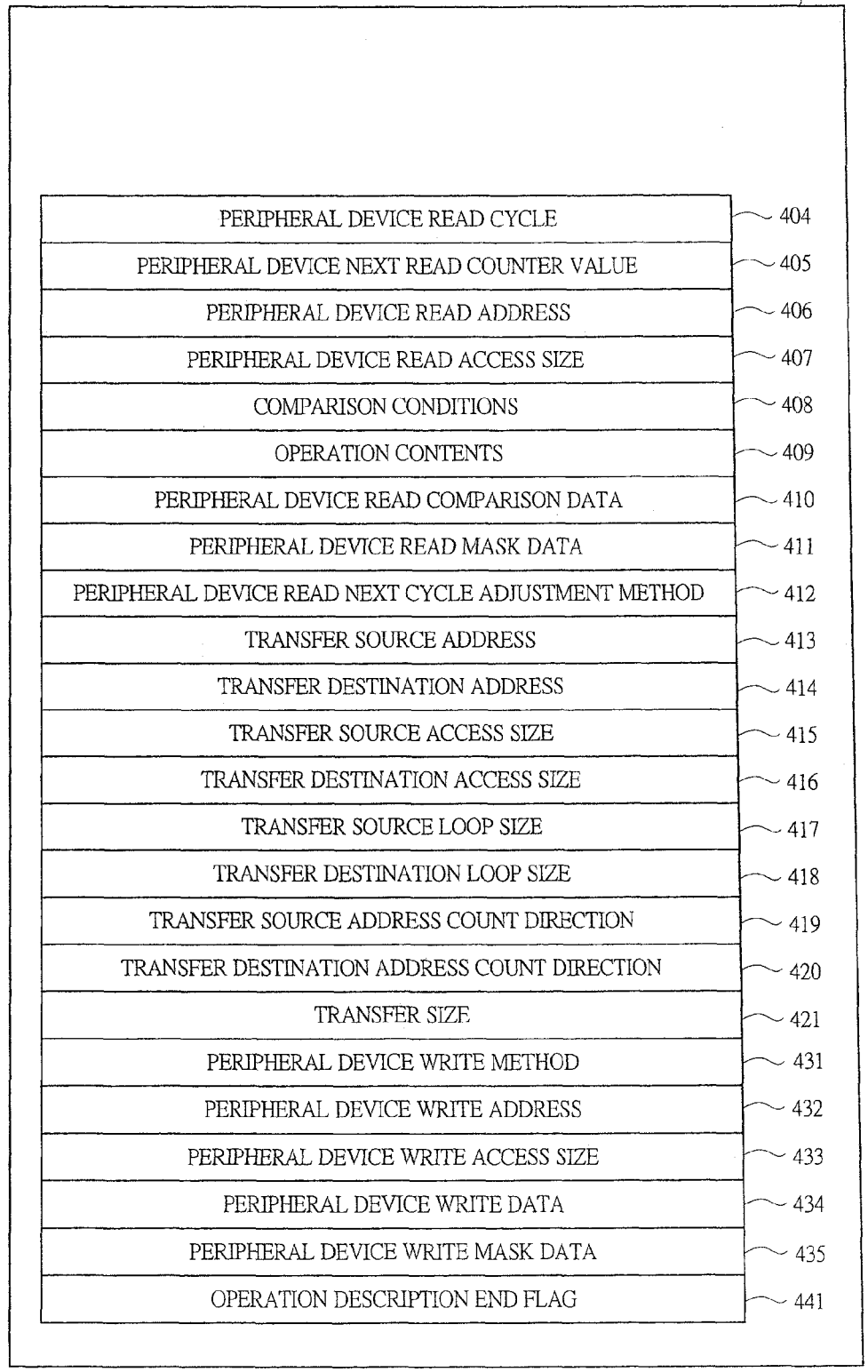
FIG. 13 is a diagram illustrating a configuration of a descriptor according to the fourth embodiment of the present invention.

FIG. 13 is a diagram illustrating a configuration of the descriptor in the DMAC 108 according to the present embodiment. In FIG. 13, respective descriptors of a peripheral device read cycle descriptor 404 to a transfer size descriptor 421, and a peripheral device write method descriptor 431 to a peripheral device write mask data descriptor 435 are descriptors which describe information corresponding to respective registers of the peripheral device read cycle register 204 to the transfer size register 221, and the peripheral device write method register 231 to the peripheral device write mask data register 235 in FIG. 12. Upon executing a periodic transfer according to the contents defined in the descriptors, the contents of the descriptors are read from the memory 104 to the corresponding registers in the register 111, respectively.

An operation description end flag descriptor 441 is a descriptor indicating whether there is a next descriptor on the memory 104 or not.

Hereinafter, contents of the operation in the DMAC 108 according to the present embodiment will be described.

When the operation enable register 201 is set to an operation state by the CPU 101, the register 111, via the bus IF 110, reads the descriptors of the configuration in FIG. 13 described at addresses stored in the operation description address register 241 from the memory 104 to respective registers of the peripheral device read cycle register 204 to the transfer size register 221, and the peripheral device write method register 231 to the peripheral device write mask data register 235. Then, in accordance with the read contents of the register 111, periodic transfers are performed by the same operation with the contents described in the first embodiment or the second embodiment.

When the execution of the periodic transfer terminates, by updating the address stored in the operation description address register 241 to the address on the memory 104 in which the operation description end flag descriptor 441 is stored, the operation description end flag descriptor 441 is read. When the read data is a value indicating the end of the descriptor, the operation of the periodic transfer is terminated. When the read data is a value indicating existence of a next descriptor, the operation description address register 241 is further updated to address at which the next descriptor is stored, the descriptor stored at the address is read, the contents of the register 111 are updated in accordance with the read contents, and the periodic transfer is executed in accordance with the contents described in the descriptor.

In the DMAC 108 according to the present embodiment, since the definitions of the operation contents are retained as a descriptor on the memory 104 instead of hardware in the DMAC upon handling DMA transfers in a plurality of cycles and among a plurality of peripheral devices, flexibility and extendability of the definitions of the operation contents can be improved.

Fifth Embodiment

A DMA controller with peripheral device state confirmation function (hereinafter, called "DMAC") of a fifth embodiment of the present invention will be described with reference to FIGS. 14 and 15. In the DMAC according to the present embodiment, a periodic operation is achieved by a trigger-type interrupt.

Figure 14:
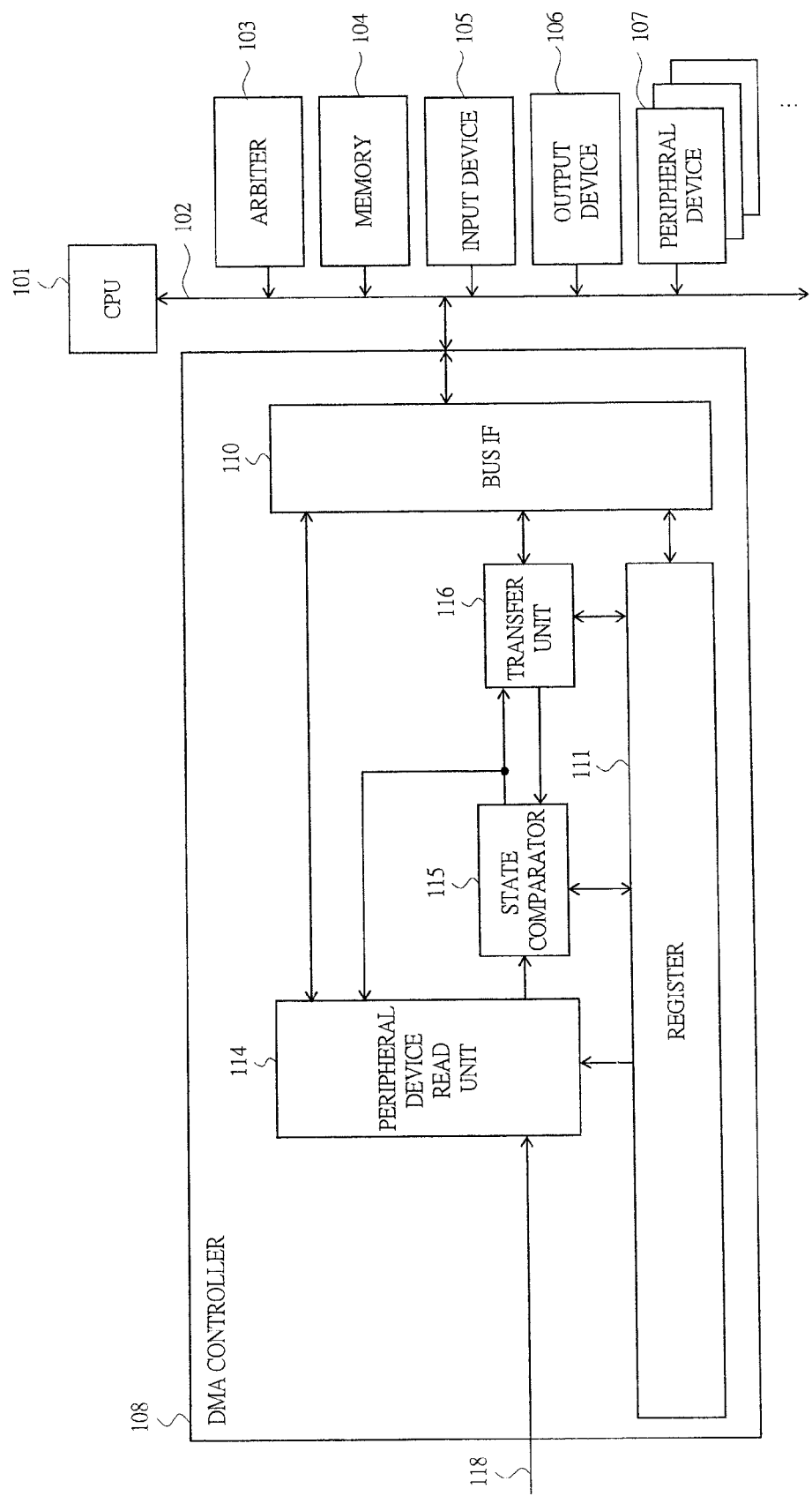
FIG. 14 is a function block diagram illustrating a configuration of a computer system mounting a DMAC according to a fifth embodiment of the present invention.

FIG. 14 is a function block diagram illustrating a configuration of a computer system mounting the DMAC according to the present embodiment. The DMAC 108 according to the present embodiment has a configuration in which, in the configuration of the DMAC 108 illustrated in FIG. 1 of the first embodiment, instead of the comparison result by the operations of the counter 112 and the comparator 113, a trigger-type interrupt signal 118 sent from the peripheral device 107 is inputted to the peripheral device read unit 114.

Figure 15:
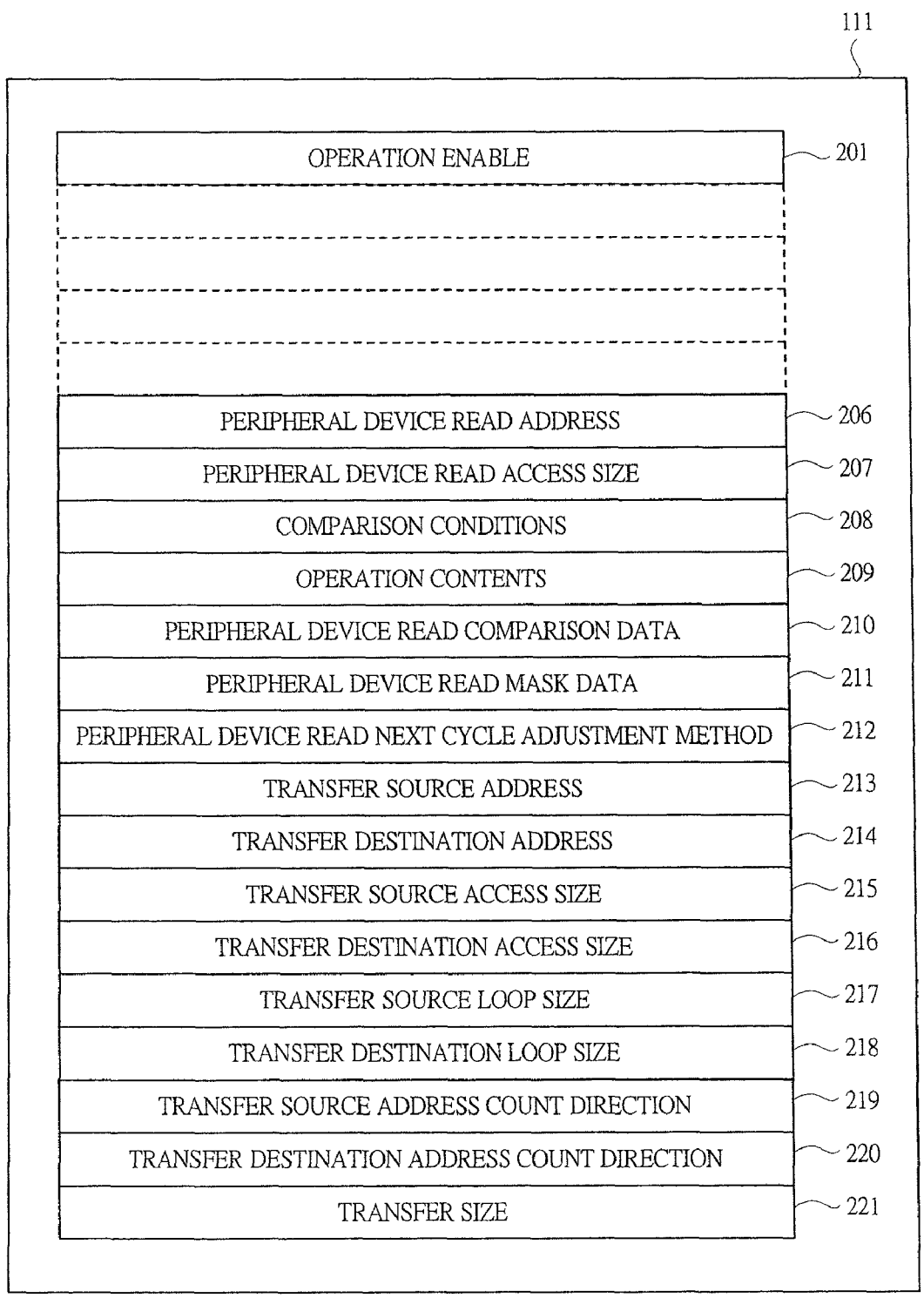
FIG. 15 is a diagram illustrating a configuration of registers according to the fifth embodiment of the present invention.

FIG. 15 is a diagram illustrating a configuration of registers which the register 111 has in the DMAC 108 according to the present embodiment. Contents of respective registers are the same with those in FIG. 2 of the first embodiment described above, and thus a repetitive description thereof will be omitted here.

The peripheral device read unit 114 receives the interrupt signal 118 instead of the comparison result from the counter comparator 113 in FIG. 1 of the first embodiment described above, and thereafter, operates in the same manner with the DMAC 108 according to the first embodiment.

In the DMAC 108 according to the present embodiment, when jitters are negligible as the operation cycle of the peripheral device 107 is stable, necessity of counting the cycles by the DMAC 108 is eliminated by use of the interrupt signal 118 from the peripheral device 107, and thus periodic DMA transfer can be performed at further lower cost and with lower power consumption without placing a load on the CPU.

Sixth Embodiment

A DMA controller with peripheral device state confirmation function (hereinafter, called "DMAC") of a sixth embodiment of the present invention will be described with reference to FIGS. 16 and 17. In the DMAC according to the present embodiment, a periodic operation is achieved by a level-type interrupt.

Figure 16:
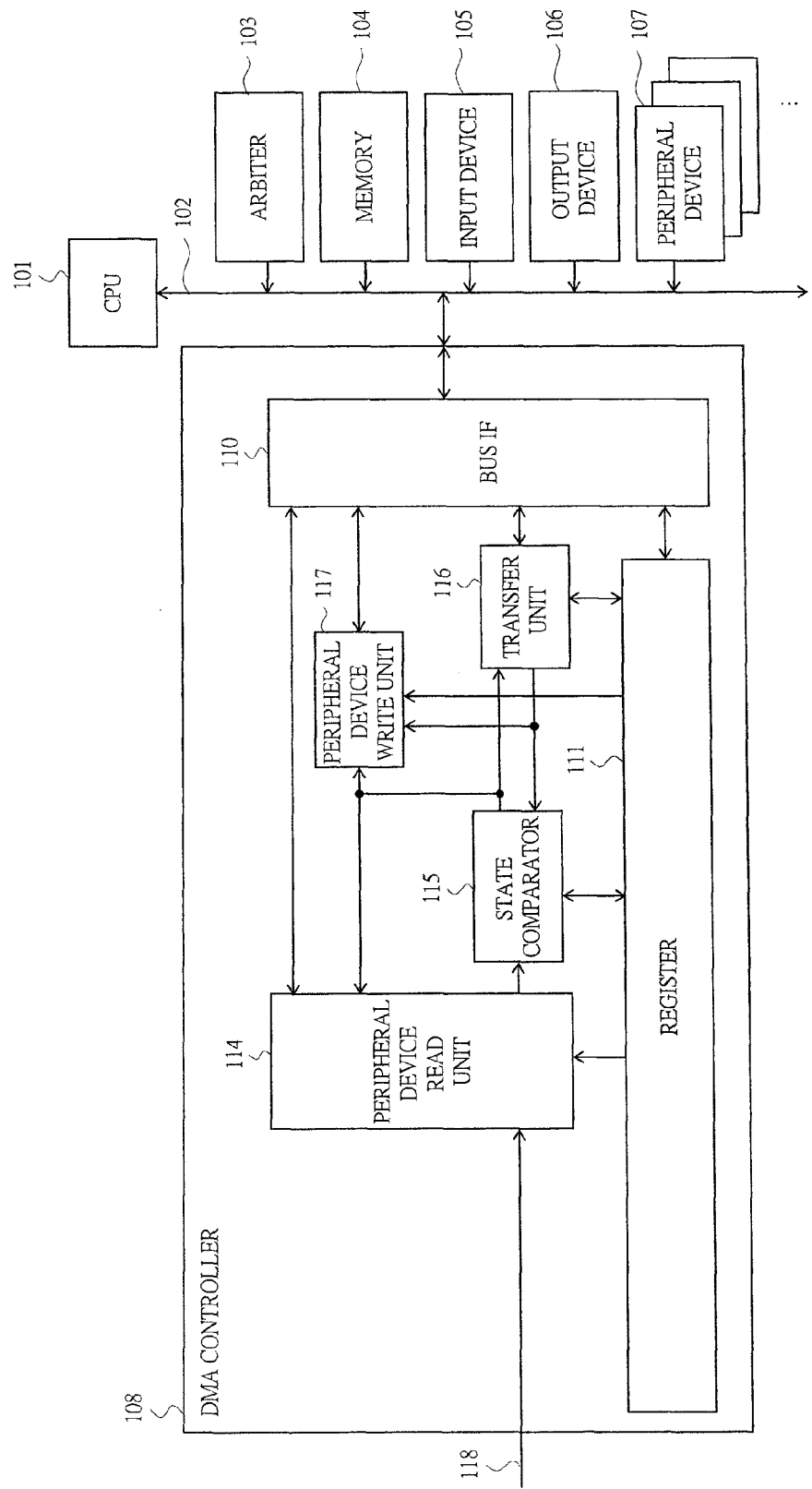
FIG. 16 is a function block diagram illustrating a configuration of a computer system mounting a DMAC according to a sixth embodiment of the present invention.

FIG. 16 is a function block diagram illustrating a configuration of a computer system mounting the DMAC according to the present embodiment. The DMAC 108 according to the present embodiment has a configuration in which, in the configuration of the DMAC 108 illustrated in FIG. 9 of the second embodiment, a level-type interrupt signal 118 sent from the peripheral device 107 is inputted to the peripheral device read unit 114 instead of the comparison result by the operations of the counter 112 and the counter comparator 113.

Figure 17:
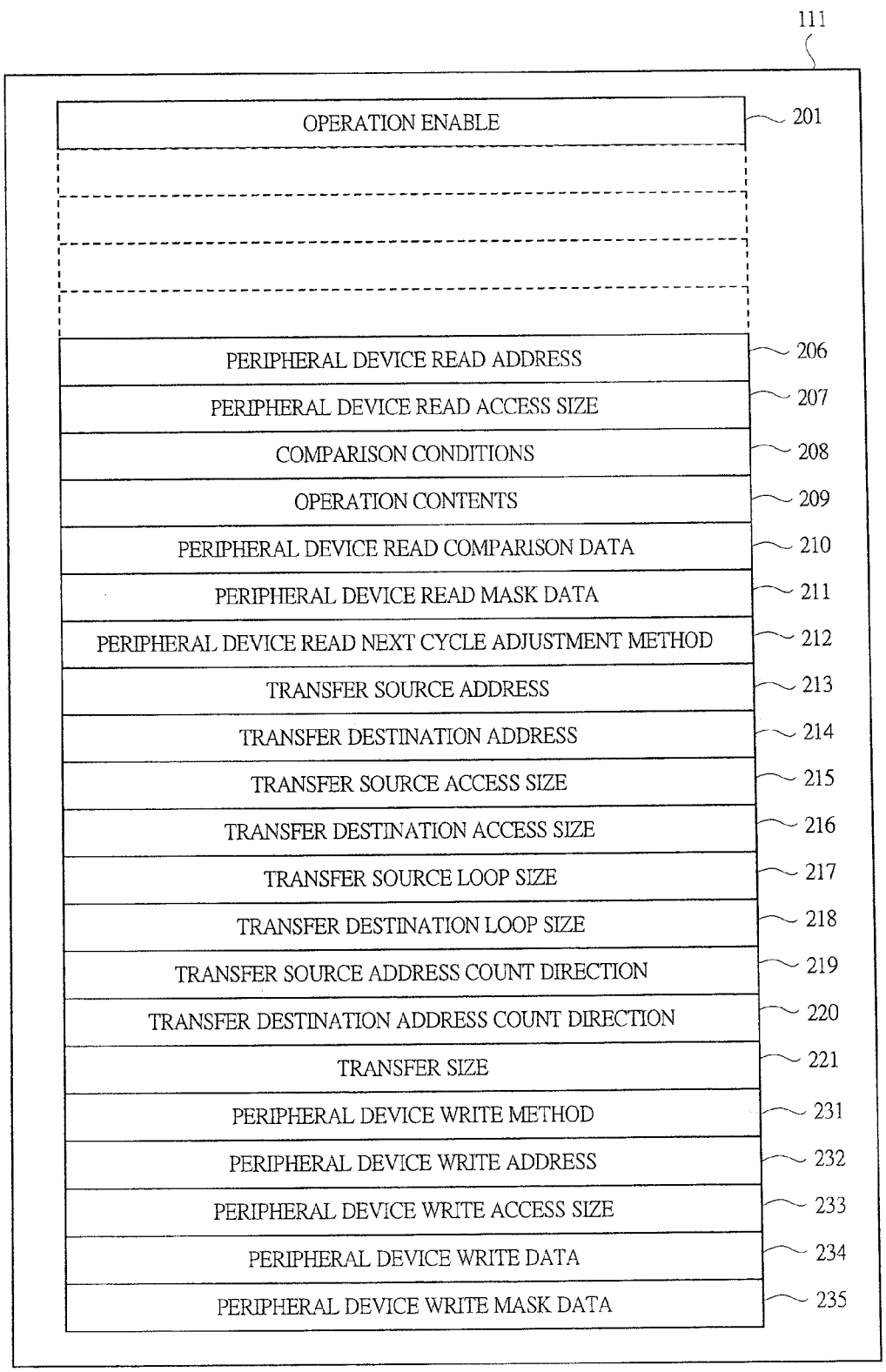
FIG. 17 is a diagram illustrating a configuration of registers according to the sixth embodiment of the present invention.

FIG. 17 is a diagram illustrating a configuration of registers which the register 111 has in the DMAC 108 according to the present embodiment. Contents of respective registers are the same with those in FIG. 10 of the second embodiment described above, and thus repetitive descriptions thereof will be omitted here.

The peripheral device read unit 114, instead of a comparison result from the comparator 113 in FIG. 9 of the second embodiment described above, receives the interrupt signal 118, and thereafter, operates in the same manner with the DMAC 108 according to the second embodiment.

In the DMAC 108 according to the present embodiment, similarly to the fifth embodiment described above, when jitters are negligible as the operation cycle of the peripheral device 107 is stable, necessity of counting the cycle by the DMAC 108 is eliminated by use of the interrupt signal 118 from the peripheral device 107, and thus a periodic DMA transfer can be performed at further lower cost and with lower power consumption without placing a load on the CPU.

Further, control of cancelling interrupt factors of the peripheral device 107 etc. can be performed by the peripheral device write unit 117, and thus it becomes possible to more flexibly synchronize with peripheral devices.

Seventh Embodiment

A DMA controller with peripheral device state confirmation function (hereinafter, called "DMAC") of a seventh embodiment of the present invention will be described with reference to FIGS. 18 and 19. In the DMAC according to the present embodiment, a periodic operation is achieved by an interrupt to a plurality of peripheral devices from these peripheral devices.

Figure 18:
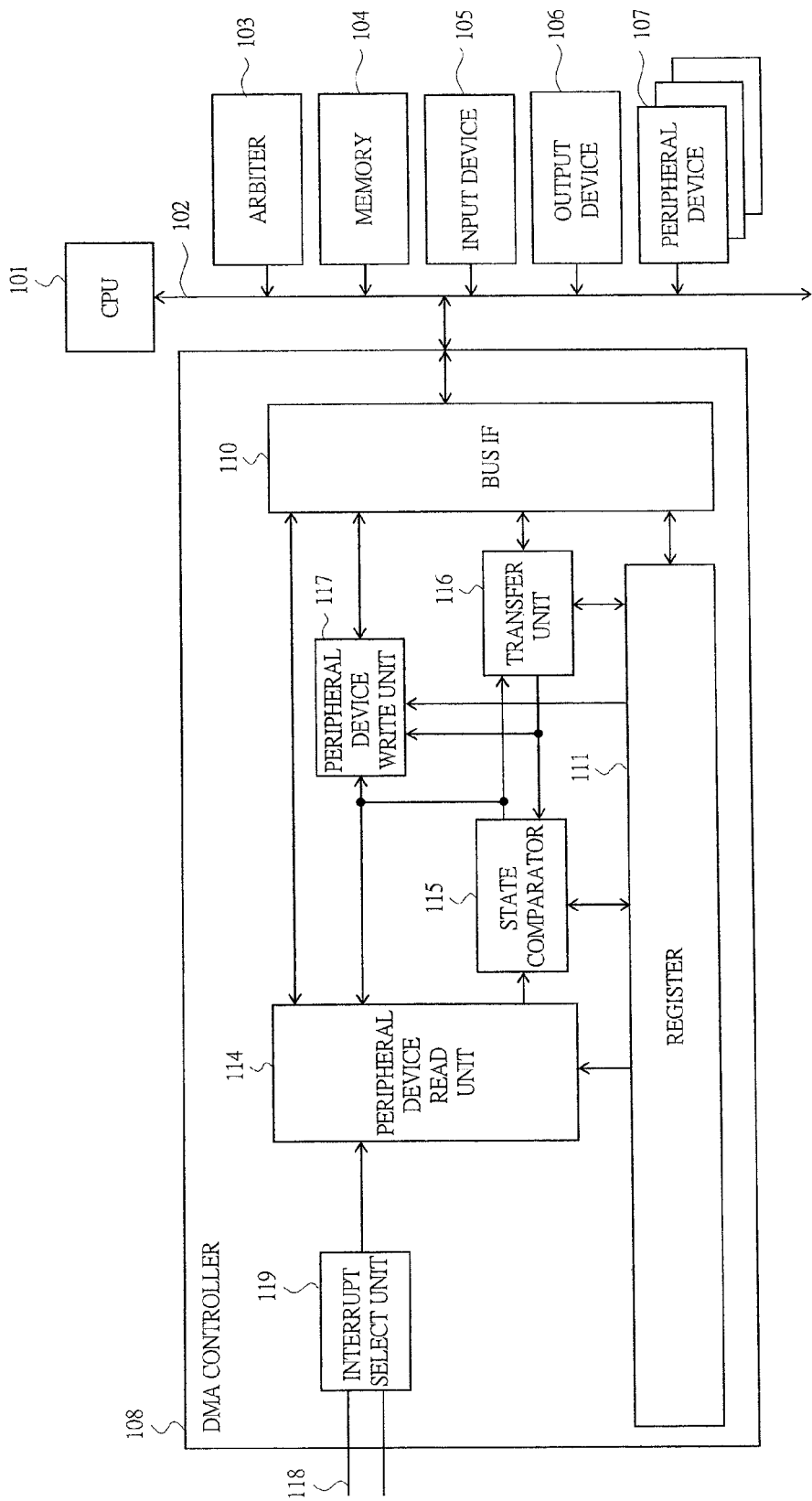
FIG. 18 is a function block diagram illustrating a configuration of a computer system mounting a DMAC according to a seventh embodiment of the present invention.

FIG. 18 is a function block diagram illustrating a configuration of a computer system mounting the DMAC according to the present embodiment. The DMAC 108 according to the present embodiment has a configuration in which, in the configuration of the DMAC 108 illustrated in FIG. 9 according to the second embodiment, instead of the counter 112 and the counter comparator 113, interrupt signals 118 sent from the plurality of peripheral devices 107 and an interrupt select unit 119 are included. The interrupt select unit 119 can input the plurality of interrupt signals 118, and when the interrupt signals 118 are overlapped, one of the interrupt signals 118 is selected based on a priority order and passed to the peripheral device read unit 114.

FIG. 19 is a diagram illustrating a configuration of registers which the register 111 has in the DMAC 108 according to the present embodiment. Contents of respective registers are the same with those in FIG. 11 of the third embodiment described above, and thus repetitive descriptions thereof will be omitted here.

The peripheral device read unit 114, instead of a comparison result from the counter comparator 113 in FIG. 9 of the second embodiment described above, receives, from the interrupt select unit 119, the interrupt signals 118 to which information for discriminating which peripheral device 107 the interrupt is sent from is added, and thereafter, operates in the same manner with the DMAC 108 according to the third embodiment.

By the DMAC 108 according to the present embodiment, when the interrupt signals 118 from the plurality of peripheral devices 107 are overlapped, one of them is selected in accordance with a priority order, and thus DMA transfer can be performed with using the interrupt signal 118 to the plurality of peripheral devices 107.

Eighth Embodiment

A DMA controller with peripheral device state confirmation function (hereinafter, called "DMAC") which is an eighth embodiment of the present invention will be described with reference to FIGS. 20 and 21. In the DMAC according to the present embodiment, upon achieving a periodic transfer based on a priority order of a plurality of interrupts, a descriptor is used for defining the operation of the periodic transfer.

A configuration of a computer system mounting the DMAC according to the present embodiment is the same with that in FIG. 18 according to the seventh embodiment.

Figure 20:
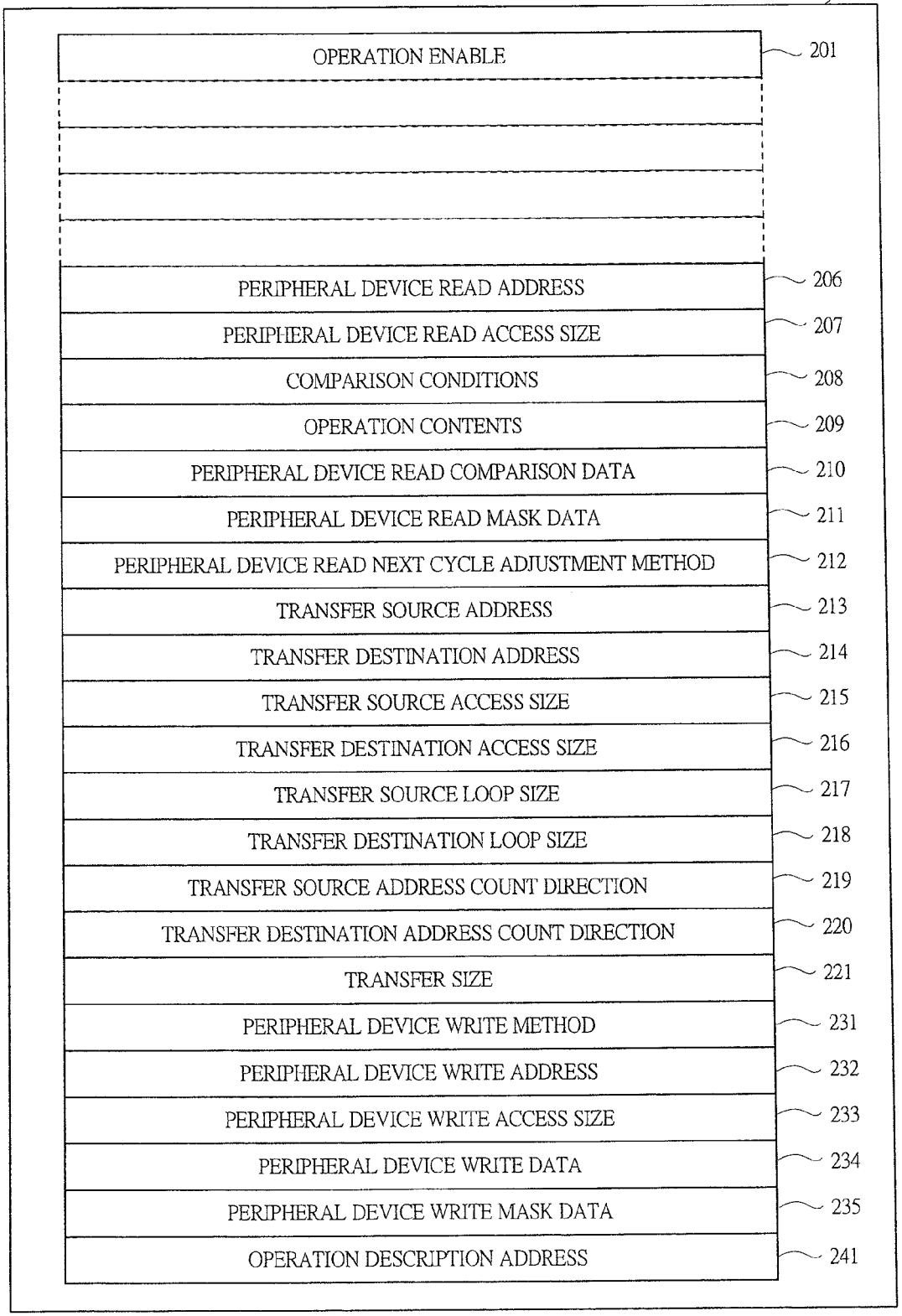
FIG. 20 is a diagram illustrating a configuration of registers according to an eighth embodiment of the present invention.
Figure 21:
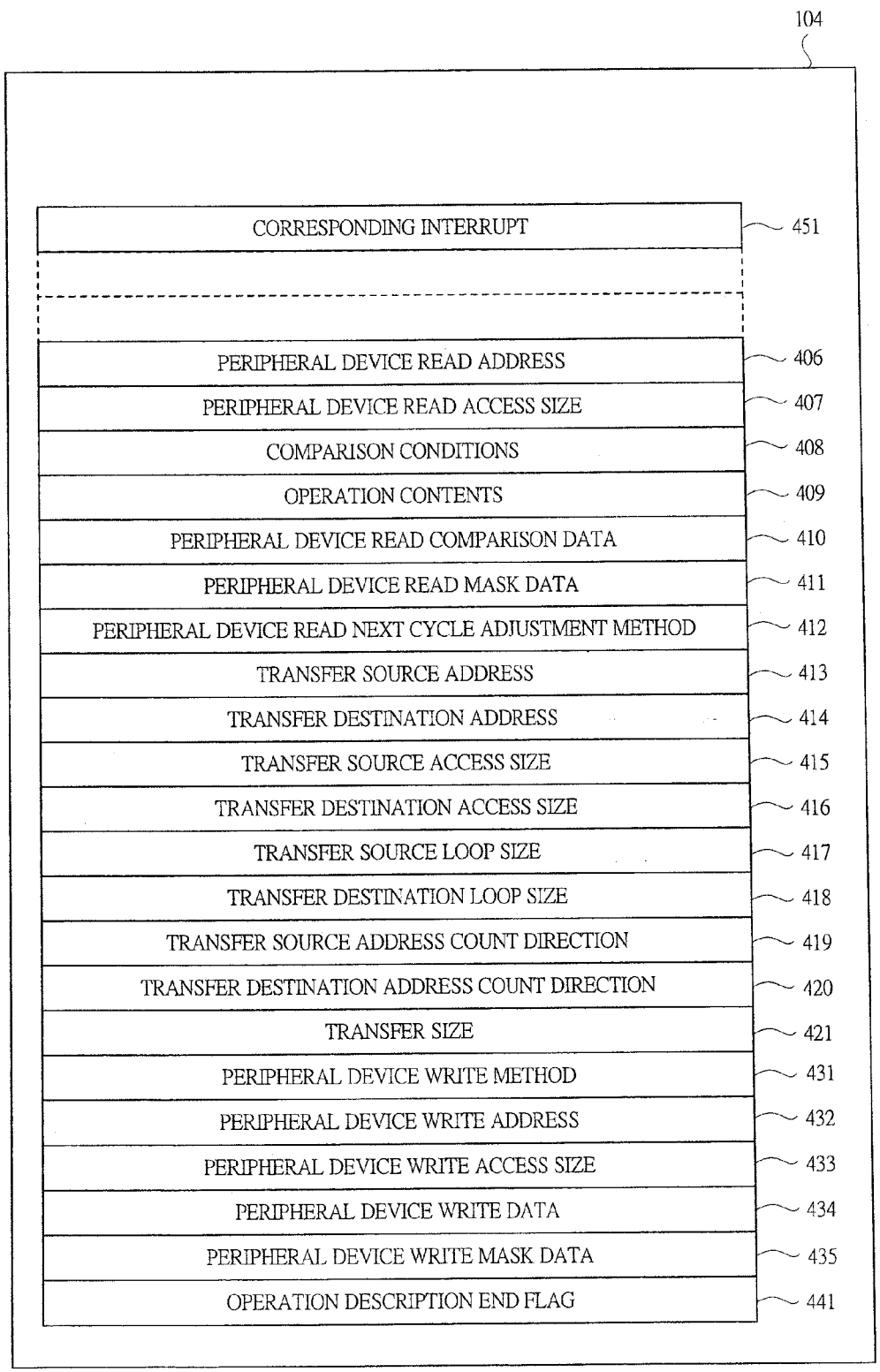
FIG. 21 is a diagram illustrating a configuration of a descriptor according to the eighth embodiment of the present invention.

FIG. 20 is a diagram illustrating a configuration of registers which the register 111 has in the DMAC 108 according to the present embodiment, and FIG. 21 is a diagram illustrating a configuration of a descriptor in the DMAC 108 according to the present embodiment.

A corresponding interrupt descriptor 451 in FIG. 21 stores discriminating information for corresponding descriptors defining operations of respective cycle transfers to the plurality of interrupt signals 118 in FIG. 18. Contents of other respective registers and respective descriptors are the same with those in FIGS. 12 and 13 of the fourth embodiment described above, and thus repetitive descriptions thereof will be omitted here.

The peripheral device read unit 114, instead of a comparison result from the counter comparator 113 in FIG. 9 of the second embodiment described above, receives, from the interrupt select unit 119, interrupt signals 118 to which information for discriminating which peripheral device 107 the signal is from is added, and specifies a descriptor having the corresponding interrupt descriptor 451 that corresponds to the discriminating information and reads the descriptor from the register 111, and thereafter, operates in the same manner with the DMAC 108 according to the fourth embodiment.

In the DMAC 108 according to the present embodiment, since the definitions of the operation contents are retained as a descriptor on the memory 104 instead of hardware in the DMAC upon performing a DMA transfer with using the interrupt signals 118 from the plurality of peripheral devices 107, and thus flexibility and extendability of the definitions of the operation contents can be improved.

Ninth Embodiment

A DMA controller with peripheral device state confirmation function (hereinafter, called "DMAC") which is a ninth embodiment of the present invention will be described with reference to FIG. 22.

Figure 22:
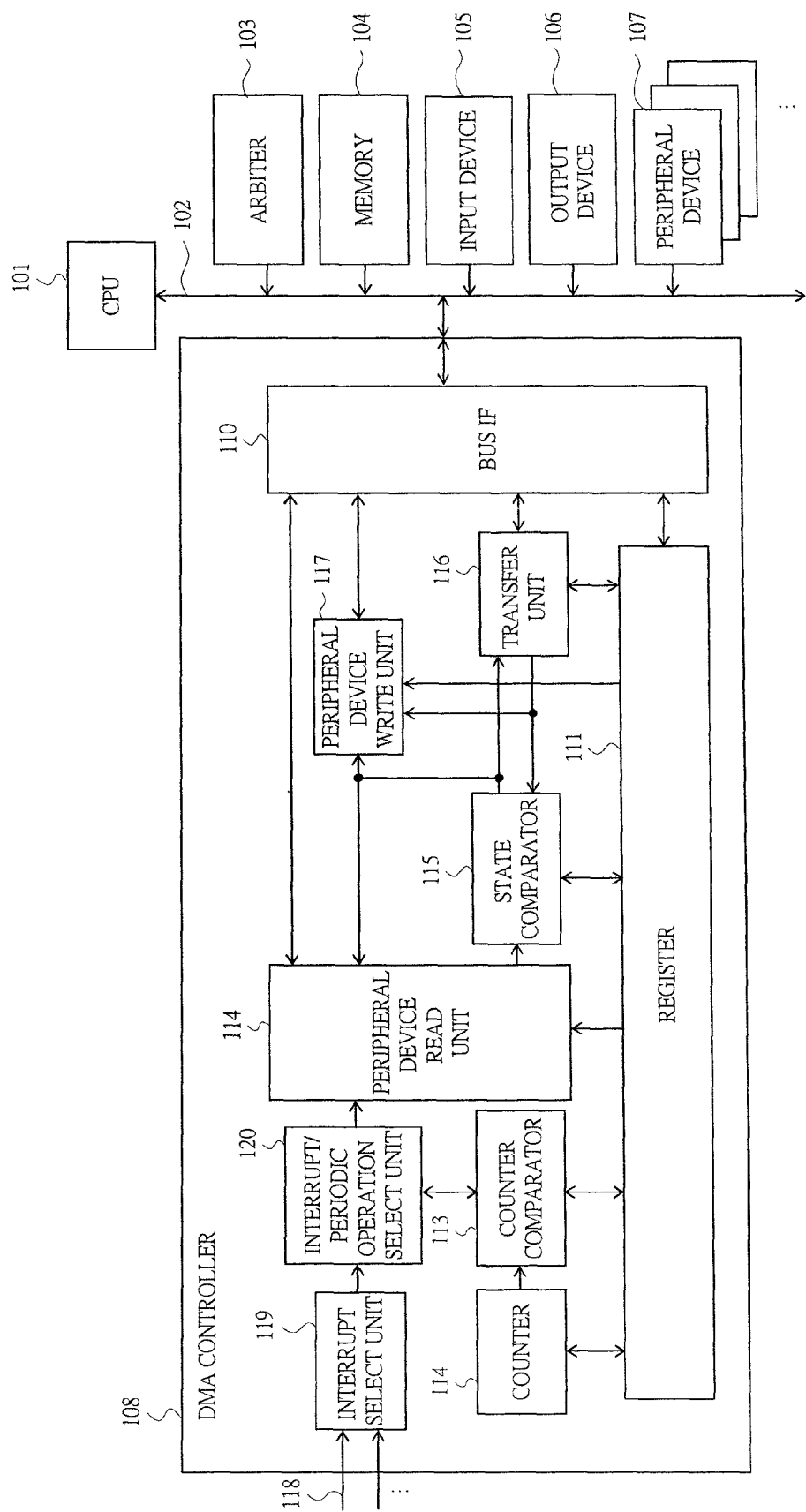
FIG. 22 is a function block diagram illustrating a configuration of a computer system mounting a DMAC according to a ninth embodiment of the present invention.

FIG. 22 is a function block diagram illustrating a configuration of a computer system mounting the DMAC according to the present embodiment. The DMAC 108 according to the present embodiment further has the interrupt signal 118, the interrupt select unit 119, and interrupt/periodic operation select unit 120 in the configuration of the DMAC 108 illustrated in FIG. 9 of the second embodiment.

As to the interrupt signal 118 and the interrupt select unit 119, they are the same with the contents of FIG. 18 of the seventh embodiment described above, and thus repetitive descriptions thereof will be omitted here. The interrupt/periodic operation select unit 120 takes a comparison result from the counter comparator 113 and the interrupt signal from the interrupt select unit 119 as inputs, and selects either of them and passes the selected one to the peripheral device read unit 114.

By the DMAC 108 according to the present embodiment, a periodic operation by time measurement using the counter 112 and a periodic operation by interrupt can be used in a mixed way, and thus it becomes possible to efficiently use existing peripheral devices.

While the invention made by the inventors has been concretely described based on the embodiments in the foregoing, it is needless to say that the present invention is not limited to the foregoing embodiments and various modifications and alterations can be made within the scope of the present invention.

INDUSTRIAL APPLICABILITY

The present invention can be used in a DMA controller which handles data transfer among peripheral devices handling multimedia data in a computer system. Moreover, when peripheral devices including not only the DMA controller but also, for example, HDD, SD memory, SDIO, MMC, network IF, tuner, decoder, image output equipment, etc. have a function of bus master as a result of speed improvement and perform data transfer among themselves, the present invention can be used in these peripheral devices.

What is claimed is:

1. A DMA controller comprising:
   a peripheral device read unit configured to read states of a plurality of peripheral devices to acquire the states of the plurality of peripheral devices;
   a state comparator;
   a transfer unit configured to execute a DMA transfer; and
   a register including contents to operate the peripheral device read unit, the state comparator, and the transfer unit to execute DMA transfer;
   a peripheral device write unit configured to write data in each register of the peripheral devices according to the contents in the register when the DMA transfer is executed or the DMA transfer is finished for performing control of the peripheral devices or notification of information to the peripheral devices; and
   an interrupt select unit,
   wherein, the interrupt select unit is configured to receive a plurality of interrupt signals and to select one interrupt signal among the plurality of interrupt signals, wherein the selected interrupt signal determines whether the peripheral device read unit, the state comparator and the transfer unit are at a timing to execute operations,
   wherein, at the timing when the operations are to be executed by the peripheral device read unit, the state comparator, and the transfer unit, the peripheral device read unit reads the states of the plurality of peripheral devices according to the contents set in the register, and the state comparator determines whether to start the DMA transfer by the transfer unit according to the states of the plurality of peripheral devices and a start condition of the DMA transfer set in the register,
   wherein, when the state comparator determines to start the DMA transfer, the transfer unit executes data transfer between the peripheral devices.

2. A DMA controller comprising:
   a transfer unit configured to execute a DMA transfer,
   a register;
   a peripheral device read unit configured to read the states from the plurality of peripheral devices,
   a state comparator configured to compare the states read by the peripheral device read unit with a start condition of the DMA transfer set in the register; and
   a peripheral device unit configured to write data in each register of the peripheral devices according to the contents in the register when the DMA transfer is executed or the DMA transfer is finished for performing control of the peripheral devices or notification of information to the peripheral devices,
   wherein, the peripheral device read unit, when started by an interrupt signal from the peripheral devices, is configured to read the states from the plurality of peripheral devices, and
   wherein the state comparator is configured to determine whether to start the DMA transfer by the transfer unit according to the states of the plurality of peripheral devices and a start condition of the DMA transfer set in the register,
   wherein, when the state comparator determines to start the DMA transfer, the transfer unit executes data transfer between the peripheral devices.

3. The DMA controller according to claim 1,
   wherein the peripheral device read unit is configured to repeat reading of the states from the peripheral devices until the comparison result by the state comparator is established.

4. The DMA controller according to claim 2,
   wherein the peripheral device read unit is configured to repeat reading of the states from the peripheral devices until the comparison result by the state comparator is established.

5. The DMA controller according to claim 1, comprising:
   a first register configured to store, in accordance with the instruction from a CPU, a pattern of operation contents upon executing the processing of updating the counter value indicating the expected time of the DMA transfer to the next expected time, the read of the register of the peripheral device by the peripheral device read unit, the comparison by the state comparator, and the DMA transfer on condition of establishment of the comparison result by the state comparator, with being triggered by establishment of the comparison result by the counter comparator.

6. The DMA controller according to claim 5, comprising:
   a second register is configured to store, in accordance with the instruction from the CPU, an access size upon reading the register of the peripheral device by the peripheral device read unit; and a third register is configured to store, in accordance with the instruction from the CPU, comparison conditions upon comparing the value of the register of the peripheral device and the start condition of the DMA transfer by the state comparator.

7. The DMA controller according to claim 1, comprising:
   a fourth register is configured to store, in accordance with instruction from a CPU, a pattern of a method of adjusting a next cycle upon reading the register of the peripheral device by the peripheral device read unit.

* * * * *